US011914018B2

(12) United States Patent
Hui et al.

(10) Patent No.: US 11,914,018 B2
(45) Date of Patent: Feb. 27, 2024

(54) SYSTEM AND METHOD FOR ULTRA-HIGH-RESOLUTION RANGING USING RFID

(71) Applicant: Cornell University, Ithaca, NY (US)

(72) Inventors: Xiaonan Hui, Ithaca, NY (US); Edwin C. Kan, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 17/900,480

(22) Filed: Aug. 31, 2022

(65) Prior Publication Data

US 2022/0413082 A1 Dec. 29, 2022

Related U.S. Application Data

(63) Continuation of application No. 17/289,702, filed as application No. PCT/US2019/059274 on Oct. 31, 2019, now Pat. No. 11,519,996.

(Continued)

(51) Int. Cl.
*G01S 1/30* (2006.01)
*G01S 1/04* (2006.01)
(Continued)

(52) U.S. Cl.
CPC .............. *G01S 1/306* (2013.01); *G01S 1/022* (2013.01); *G01S 1/0428* (2019.08); *G01S 13/84* (2013.01); *G01S 13/751* (2013.01)

(58) Field of Classification Search
CPC ........ G01S 1/306; G01S 1/0428; G01S 1/022; G01S 13/84; G01S 13/751
(Continued)

(56) References Cited

U.S. PATENT DOCUMENTS 3,758,849 A * 9/1973 Susman ................. G08B 13/24
324/225
4,307,397 A * 12/1981 Holscher ................. G01S 13/84
342/127
(Continued)

FOREIGN PATENT DOCUMENTS

DE 102011084610 A1 * 4/2013 ............. G01S 13/02
DE 102015222884 A1 * 5/2017 ........... G01S 13/343
(Continued)

OTHER PUBLICATIONS

Extended European Search Report for Application No. 19878965.3-1206, dated Sep. 26, 2022, 15 pages.

*Primary Examiner* — Nuzhat Pervin
(74) *Attorney, Agent, or Firm* — Barnes & Thornburg LLP

(57) ABSTRACT

A radio-frequency method for range finding includes modulating a reference signal having an intermediate frequency to a downlink signal having a carrier frequency using a clock signal. The downlink signal is transmitted to a tag using a transceiver. An uplink signal backscattered front the tag is received and demodulated using the clock signal. The uplink signal has a frequency that is a harmonic of the carrier frequency. A distance between the tag and the transceiver is calculated based on a phase of the demodulated uplink signal. A system for range finding includes a transceiver and a processor. The transceiver modulates a reference signal to downlink signal and transmits the downlink signal. The transceiver receives and demodulates an uplink signal. The processor is configured to receive the demodulated uplink signal and calculate a distance between the tag and the transceiver using a phase of the demodulated uplink signal.

19 Claims, 20 Drawing Sheets

Related U.S. Application Data

(60) Provisional application No. 62/753,845, filed on Oct. 31, 2018.

(51) Int. Cl.
*G01S 1/02* (2010.01)
*G01S 13/84* (2006.01)
*G01S 13/75* (2006.01)

(58) Field of Classification Search
USPC .......................................................... 342/47
See application file for complete search history.

(56) References Cited

U.S. PATENT DOCUMENTS

| | | | | |
|---|---|---|---|---|
| 5,298,904 A * | 3/1994 | Olich | ...... | G01S 13/84 342/127 |
| 5,640,683 A * | 6/1997 | Evans | ...... | G06K 7/0008 455/45 |
| 5,777,561 A * | 7/1998 | Chieu | ...... | G06K 7/10039 342/42 |
| 5,873,025 A * | 2/1999 | Evans | ...... | G01S 13/825 455/63.1 |
| 5,952,922 A * | 9/1999 | Shober | ...... | G06K 7/0008 340/10.5 |
| 6,650,230 B1 * | 11/2003 | Evans | ...... | G06K 7/10069 342/51 |
| 7,096,133 B1 | 8/2006 | Martin | ...... | G01R 31/31708 702/77 |
| 7,336,078 B1 * | 2/2008 | Merewether | ...... | G01V 3/15 324/67 |
| 7,603,894 B2 * | 10/2009 | Breed | ...... | B60C 23/0413 73/146 |
| 7,693,626 B2 * | 4/2010 | Breed | ...... | B60C 23/0408 73/146.2 |
| 7,733,077 B1 * | 6/2010 | Merewether | ...... | G01V 3/08 324/67 |
| 8,024,084 B2 * | 9/2011 | Breed | ...... | B60R 21/20 701/31.4 |
| 9,395,727 B1 * | 7/2016 | Smith | ...... | G01S 7/03 |
| 9,443,358 B2 * | 9/2016 | Breed | ...... | G06F 8/65 |
| 9,489,813 B1 * | 11/2016 | Beigel | ...... | G08B 13/2417 |
| 9,582,933 B1 * | 2/2017 | Mosterman | ...... | G06T 19/00 |
| 9,645,234 B2 * | 5/2017 | Khan | ...... | G06K 7/10366 |
| 9,703,002 B1 * | 7/2017 | Olsson | ...... | G01V 3/12 |
| 9,733,353 B1 * | 8/2017 | Carlson | ...... | G01S 13/88 |
| 9,870,056 B1 * | 1/2018 | Yao | ...... | G06F 3/011 |
| 9,997,845 B2 * | 6/2018 | Schantz | ...... | H01Q 21/0087 |
| 10,738,836 B2 * | 8/2020 | Burgess | ...... | B25B 23/141 |
| 10,863,313 B2 * | 12/2020 | Markhovsky | ...... | G01S 5/0273 |
| 11,238,670 B2 * | 2/2022 | Six | ...... | G04F 10/10 |
| 2005/0190098 A1 * | 9/2005 | Bridgelall | ...... | G01S 13/878 342/146 |
| 2005/0206555 A1 * | 9/2005 | Bridgelall | ...... | G01S 13/74 340/8.1 |
| 2006/0012476 A1 * | 1/2006 | Markhovsky | ...... | G01S 13/74 342/146 |
| 2006/0022866 A1 * | 2/2006 | Walton | ...... | H01Q 21/08 342/126 |
| 2006/0284727 A1 * | 12/2006 | Steinke | ...... | G06K 19/0723 342/127 |
| 2007/0279194 A1 * | 12/2007 | Carrender | ...... | H04W 74/00 340/10.4 |
| 2008/0139156 A1 * | 6/2008 | Behzad | ...... | H04B 1/0067 455/296 |
| 2008/0299933 A1 * | 12/2008 | Chang | ...... | H04B 1/10 455/307 |
| 2009/0167699 A1 * | 7/2009 | Rosenblatt | ...... | H01Q 7/00 345/173 |
| 2010/0039228 A1 * | 2/2010 | Sadr | ...... | G01S 5/12 340/10.1 |
| 2011/0148710 A1 * | 6/2011 | Smid | ...... | G01S 13/46 342/394 |
| 2011/0187600 A1 * | 8/2011 | Landt | ...... | G01S 13/84 342/458 |
| 2011/0260839 A1 * | 10/2011 | Cook | ...... | G06K 19/07749 340/10.4 |
| 2012/0235856 A1 * | 9/2012 | Nogami | ...... | G01S 13/84 342/118 |
| 2012/0243374 A1 * | 9/2012 | Dahl | ...... | G06F 3/043 367/93 |
| 2012/0256730 A1 * | 10/2012 | Scott | ...... | G01S 13/9004 340/10.1 |
| 2013/0154919 A1 * | 6/2013 | Tan | ...... | G06F 3/03 345/156 |
| 2014/0320331 A1 * | 10/2014 | Fernandes | ...... | G01S 13/887 342/22 |
| 2015/0048970 A1 * | 2/2015 | Schoor | ...... | G01S 13/32 342/149 |
| 2015/0198708 A1 * | 7/2015 | Khan | ...... | G01S 13/878 342/146 |
| 2015/0204972 A1 * | 7/2015 | Kuehnle | ...... | G01S 13/42 342/156 |
| 2016/0131742 A1 * | 5/2016 | Schoor | ...... | H01Q 21/22 342/128 |
| 2016/0363659 A1 * | 12/2016 | Mindell | ...... | G01S 13/66 |
| 2017/0108452 A1 * | 4/2017 | Carlson | ...... | G01S 13/88 |
| 2017/0131395 A1 * | 5/2017 | Reynolds | ...... | G01S 13/56 |
| 2017/0160380 A1 * | 6/2017 | Searcy | ...... | G01S 7/2921 |
| 2019/0261137 A1 * | 8/2019 | Markhovsky | ...... | G01S 5/0273 |
| 2021/0215815 A1 * | 7/2021 | Mayer | ...... | G01S 13/34 |

FOREIGN PATENT DOCUMENTS

| | | | | |
|---|---|---|---|---|
| EP | 853392 A2 | 7/1998 | | |
| EP | 670558 B1 | 5/2000 | | |
| EP | 3120463 B1 * | 1/2018 | ...... | B60L 53/12 |
| WO | 2016065368 A1 | 4/2016 | | |
| WO | WO-2016065368 A1 * | 4/2016 | ...... | G01S 13/74 |

* cited by examiner

SYSTEM AND METHOD FOR ULTRA-HIGH-RESOLUTION RANGING USING RFID

CROSS-REFERENCE TO RELATED APPLICATIONS

This application is a continuation of U.S. application Ser. No. 17/289,702, filed on Apr. 28, 2021, which is a U.S. national stage entry of PCT International Patent Application No. PCT/US2019/059274, filed Oct. 31, 2019, which claims priority to U.S. Provisional Application No. 62/753,845, filed on Oct. 31, 2018, the disclosure of each of which is incorporated herein by reference.

STATEMENT REGARDING FEDERALLY SPONSORED RESEARCH

This invention was made with government support under contract nos. DE-AR0000528 and DE-AR0000946 awarded by the Department of Energy. The government has certain rights in the invention.

FIELD OF THE DISCLOSURE

The present disclosure relates to range finding, and more particularly, to radio frequency-based range finding.

BACKGROUND OF THE DISCLOSURE

Accurate localization with unique identification of indoor objects and objects behind visual obstructions can be critical in a variety of applications. However, current approaches suffer from numerous fundamental problems. Optical methods typically achieve high in-plane resolution but offer limited ranging accuracy. Item recognition also has a high computing load unless identification markers are used. Furthermore, objects of interest may be covered by materials such as fabrics, plastics, and building materials, which are often opaque to light. Camera-based systems have been extensively developed, and benefit from convenient use, rich information and sophisticated imaging algorithms. However, fine gesture recognition, vital-sign acquisition, three-dimensional (3D) localization of covered features or markers, and the control of haptic robotics remain challenging. Typically, multiple cameras from different viewing angles and high computational demands are required, which greatly increases system complexity and cost. In addition, camera systems are vulnerable to low ambient light and line-of-sight (LoS) obstruction. Other optical solutions, such as time-of-flight (ToF) cameras, structured-light range scanning and light detection and ranging (LIDAR), share similar problems in terms of unique identification and LoS blocking. Ultrasound ranging and imaging is an alternative approach, but has issues in terms of impedance matching when going through different layers of materials, especially for air gaps. Another approach is to use location sensors based on microelectromechanical systems (MEMS), such as the servo motor and encoder. However, the size and mechanical structure of such systems cannot effectively fit onto the human body, delicate robotic structures, or soft materials. MEMS accelerometers and gyroscopes also suffer from slow drift and their power requirement limits deployment options.

Methods based on radio-frequency (RF) have also been widely investigated. The RF identification (RFID) system can be applied to obtain a unique item-level identification, and localization can be achieved by various methods such as received signal strength indication (RSSI) with landmarks, phased-array radar, synthetic aperture radar (SAR), and inverse SAR (iSAR). However, fundamental problems in terms of precision and reliability remain. The landmark-tag method uses known coordinates and RSSI of the reference tags to retrieve the position of the unknown target tag, but suffers from insufficient range sensitivity and ambiguity from multipath interference. The SAR and iSAR methods require relative motion between the tags and reader, which is not feasible for many scenarios. For tagless methods, the phased-array radar forms narrow beams to isolate the coverage areas, but the scanning time and spatial resolution of the beam will constrain the system localization capability. The frequency modulation continuous wave (FMCW) method requires a broad frequency bandwidth and a fast Fourier transform (FFT) time window to provide high spatial resolution, and the indoor multipath will still degenerate performance substantially. Although for some applications only the tagless methods are practical, in many other real-world applications, objects can be tagged electronically, similar to the RFID system, to avoid using geometrical features for object recognition. The tag as an object transponder can backscatter the RF beacon signal integrated with the object identification and local sensor properties, which can be well isolated from other interference by subcarriers or code division to improve ranging reliability and accuracy. However, self-jamming and antenna reflection remain serious problems for ranging owing to insufficient separation of the downlink and uplink.

The phase information of the RF signal is more sensitive to the distance between the transmitter (Tx) and receiver (Rx) than RSSI, and can give higher precision if the wavelength ambiguity can be resolved. In the ideal scenario of a fully coherent Tx and Rx separated at a certain distance, Rx can use the demodulated phase of the received signal to retrieve the Tx-to-Rx distance variation, which is in a cyclic linear relation with respect to the phase variation at the given frequency. Under this simplified LoS model, no matter how small the distance change is, the phase will change accordingly. Therefore, phase-based RF ranging resolution is fundamentally limited only by the accurate Tx-Rx carrier synchronization and the phase noise skirt, not by the tradeoff of the time-domain sampling window size or bandwidth. Therefore, both high spatial and temporal resolution in ranging can potentially be achieved at the same time.

Many previous ranging methods are, in contrast, based on Fourier transforms, such as FMCW radar, and sample the data at in reciprocal k-space, recovering the range by applying the windowed Fourier transform. These methods will be unavoidably limited by the uncertainty principle in their mathematical model. For example, when the FMCW radar is configured under a certain sampling rate, the number of k-space sampling points is related to the time domain. When a narrow temporal window is applied to achieve high temporal resolution, the sinc function will spread and degenerate the spatial resolution after the convolution. This tradeoff between the spatial and temporal resolution is set by the chosen mathematical procedure, not by a physical limitation. It is possible to bypass Fourier methods to mitigate the resolution tradeoff. Hilbert-Huang transforms (HHT), including empirical mode decomposition and Hilbert spectral analysis, are widely applied to analyze the nonstationary and nonlinear data set to achieve higher resolution in Fourier pairs simultaneously with higher computational cost.

BRIEF SUMMARY OF THE DISCLOSURE

The present disclosure provides devices and methods able to achieve a ranging resolution smaller than, for example, 50 micrometers using a harmonic ultrahigh frequency (UHF; for example, 300 MHz-3 GHz) RF transponder system with a sampling rate of 1 kHz or higher. For comparison, high spatial resolution can be achieved using extremely high frequency, such as in the collision avoidance radar system of 79 GHz with 4 GHz bandwidth. However, lack of dielectric penetration is a severe limitation for extremely high frequency ranging in many applications. In contrast, the presently-disclosed UHF system can potentially achieve the maximum distance of conventional RFID systems, for example, around 15 meters in free space with a Tx power which may be below 30 dBm, and can see through dielectrics such as water and common building materials. The present system may use a transponder which is battery free and can be readily integrated into a small integrated circuit package with a printed antenna, which can be conveniently and inexpensively deployed for various applications.

A radio-frequency method for range finding, includes: modulating a reference signal having an intermediate frequency, $f_{IF}$, to a downlink signal having a carrier frequency, $f_c$, using a clock signal; transmitting the downlink signal to a tag using a transmitter, the tag being located at a distance from the transceiver; receiving an uplink signal backscattered from the tag, the uplink signal having a frequency that is a harmonic of the carrier frequency; demodulating the uplink signal using the clock signal; and calculating a distance between the tag and the transceiver based on a phase of the demodulated uplink signal. The distance is calculated by comparing the coherent reference signal to the demodulated uplink signal. The uplink signal may be at a second harmonic of the carrier frequency, for example, to lower phase noise interference from leakage of the downlink signal. The step of calculating the distance may be repeated at a sampling rate to update the distance. The intermediate frequency, $f_{IF}$, may be greater than a frequency where Flicker noise power density is equal to the thermal noise density. The method may include calculating a moving average comprising a predetermined number of most recent calculated distances. The uplink signal may have a unique digital identification code to provide isolation from ambient noise. The unique digital identification code may be encoded using a code-division multiple access (CDMA) protocol to provide isolation from other tags.

The method may include modulating the reference signal to one or more additional downlink signals each having an additional carrier frequency and each of the additional carrier frequencies generated using a corresponding clock signal, and wherein each of the additional carrier frequencies is not equal to $f_c$; transmitting, using a corresponding one or more additional transceivers, the one or more additional downlink signals to the tag; receiving one or more additional uplink signals backscattered from the tag, each of the one or more additional uplink signals being at a second harmonic of a corresponding one of the one or more additional carrier frequencies; demodulating each of the one or more additional uplink signals using the clock signal of the corresponding one or more carrier frequencies; calculating a distance between the tag and each additional transceiver based on a difference between a phase of the reference signal and a phase of a corresponding one of the one or more demodulated uplink signals.

Obtaining the distance may further include dividing a result by the square root of a relative permittivity of a medium between the transceiver and the tag, wherein the relative permittivity of the medium is known and relative to a vacuum. The method may include determining a relative permittivity of a medium in which the tag disposed, using the obtained distance and a known range of the tag, wherein the relative permittivity of the medium is relative to a vacuum.

A radio-frequency system for range finding includes a transceiver and a processor. The transceiver is configured to modulate a reference signal having an intermediate frequency, $f_{IF}$, to a downlink signal having a carrier frequency, $f_c$, using a clock signal; transmit the downlink signal; receive a backscattered uplink signal from a tag, wherein the uplink signal is at a harmonic frequency of the carrier frequency; and demodulate the uplink signal using the clock signal such that transceiver is a coherent transceiver. The processor is configured to receive the demodulated uplink signal and calculate a distance between the tag and the transceiver using a phase of the demodulated uplink signal. The processor may be further configured to repeatedly calculate the distance at a sampling rate. The processor may be further configured to calculate a moving average comprising a predetermined number of most recent calculated distances.

The system may include a tag configured to receive the downlink signal at $f_c$ and to backscatter the uplink signal at the harmonic frequency of the carrier frequency. The harmonic frequency of the carrier frequency may be the second harmonic. The tag may be configured to encode a digital identification code onto the uplink signal. The tag may be configured to encode the uplink signal using a code-division multiple access (CDMA) protocol. The system may include one or more additional tags, each configured with a unique digital identification or CDMA code. The tag may be configured to transform the downlink signal to the uplink signal without offsetting a phase of the downlink signal. The tag may include a non-linear transmission line.

The system may include an analog-to-digital converter to convert the demodulated uplink signal to a digital signal, wherein the analog-to-digital converter is configured to preserve a carrier phase of the uplink signal. The system may include a clock for generating the clock signal, wherein the clock is in communication with the transceiver.

The system may further one or more additional transceivers, each configured to modulate and transmit the reference signal at a corresponding one or more additional carrier frequencies, and to receive and demodulate corresponding uplink signals, each uplink signal at a harmonic of a corresponding one of the one or more additional carrier frequencies. The processor may be further configured to determine a relative permittivity of a medium along a path between the tag and each transceiver of the one or more additional transceivers, using an obtained distance from the corresponding transceiver and a known range of the tag from the corresponding transceiver, wherein the relative permittivity of the medium is relative to a vacuum.

DESCRIPTION OF THE DRAWINGS

For a fuller understanding of the nature and objects of the disclosure, reference should be made to the following detailed description taken in conjunction with the accompanying figures.

DETAILED DESCRIPTION OF THE DISCLOSURE

Figure 2:
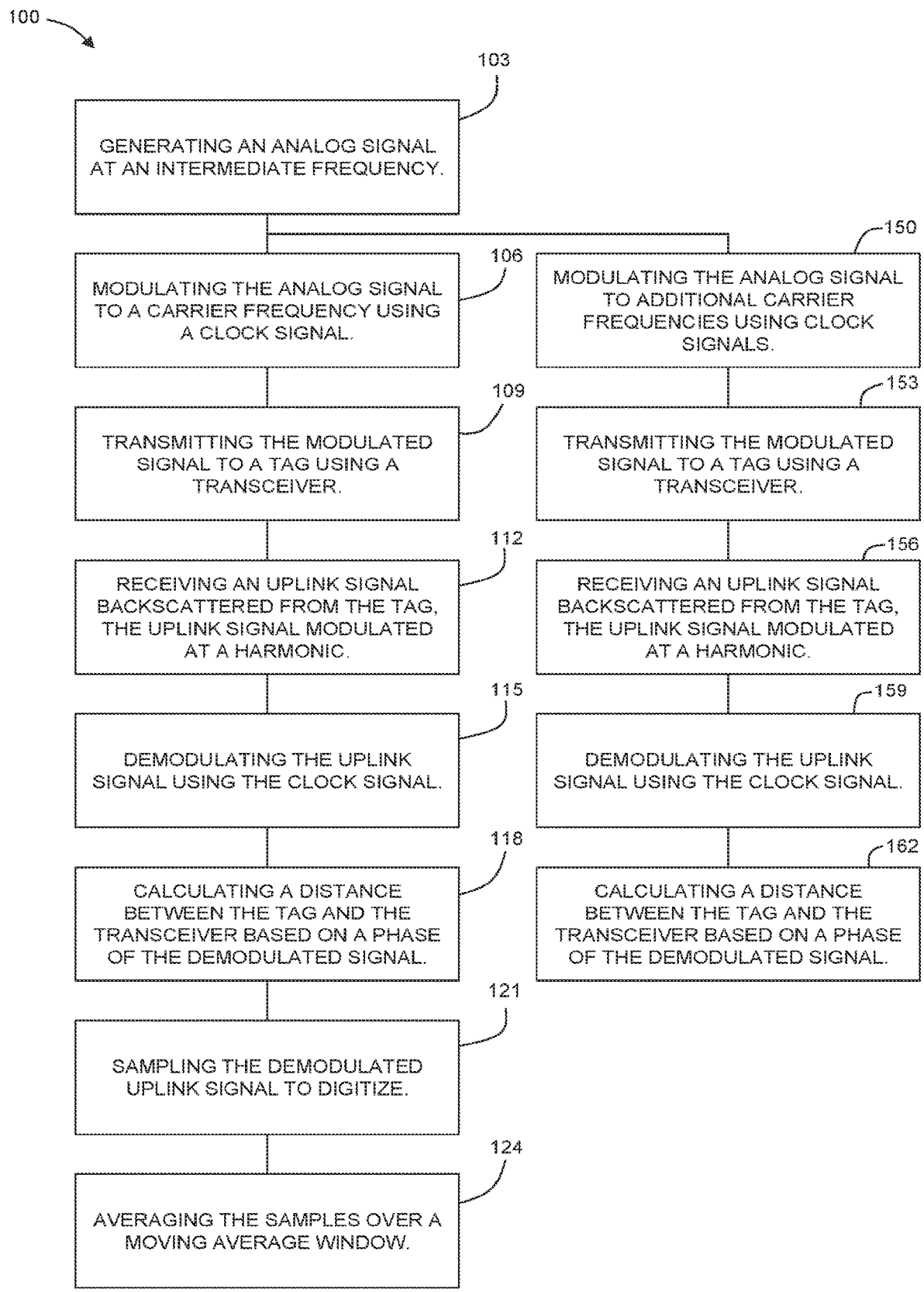
FIG. 2 is a chart of a method according to another embodiment of the present disclosure.

With reference to FIG. 2, in an aspect, the present disclosure may be embodied as a radio-frequency method 100 for range finding—e.g., finding the distance to an object. The method 100 includes modulating 106 a reference signal having an intermediate frequency, $f_{IF}$ (an "intermediate frequency signal"). In some embodiments, the reference signal may be generated 103 from a digital signal, for example, using an digital-to-analog converter. The reference signal is modulated 106 to a downlink signal having a carrier frequency, $f_c$, using a clock signal.

The downlink signal is transmitted 109 using a transceiver. The downlink signal may be transmitted 109 to a tag located at a distance from the transceiver. By "transmitted to a tag," the downlink signal is not necessarily directed only to the tag, but may be, for example, wirelessly broadcast so as to be received at the tag. The transceiver may be an RFID reader system or a part of such a system.

The method 100 includes receiving 112 an uplink signal that is backscattered from the tag, the uplink signal being at a harmonic of the carrier frequency. For example, the uplink signal may be at a second harmonic, $2f_c$ of the carrier frequency. The harmonic RFID system makes use of harmonic backscattering to isolate the downlink (reader to tag) and uplink (tag to reader), which results in a much lower noise floor to achieve accurate ranging. Because of the backscattering scheme, the tag and reader carrier synchronization problem is also readily avoided. A detailed comparison of conventional and harmonic RFID systems is discussed below, which includes analyses of the operational range and link budget.

The uplink signal is demodulated 115 using the clock signal. In this way, the modulating and demodulating steps use the same clock signal and are coherent. It is noted that the clock signal need not be at the carrier frequency (or a harmonic of the carrier frequency). For example, a mixer in the transmitter may use a local oscillator (at the carrier frequency) which is derived from the clock signal. Similarly, a mixer in the receiver may use a local oscillator (at a harmonic of the carrier frequency) which is derived from the clock signal.

A distance between the tag and the transceiver is calculated 118 based on a phase of the demodulated uplink signal. For example, the distance may be calculated 118 based on a difference between a phase of the reference signal and a phase of the demodulated uplink signal.

In some embodiments, the step of calculating 118 the distance is repeated at a sampling rate. For example, the steps of transmitting the downlink signal, receiving the uplink signal, demodulating the uplink signal, and calculating the distance may each be repeated at a sampling rate. In another example, the reference signal may be continuously modulated and transmitted (for some period of time), and the backscattered uplink signal may be continuously received and demodulated. The demodulated uplink signal be used to repeatedly calculate the distance between the tag and the transceiver. In this way, a moving object can be tracked over its movement. The sampling rate may be 10 Hz-10 kHz, inclusive, including every integer Hz value therebetween (e.g., 20 Hz, 100 Hz, 200 Hz, 500 Hz, 1 kHz, 1.5 kHz, 5 kHz, 8 kHz, 9 kHz). The sampling rate may be higher or lower.

The demodulated uplink signal may be sampled 121 at a sampling rate so as to digitize the demodulated uplink signal. The resulting samples may be averaged 124 over a moving average window.

In some embodiments, the method 100 may further comprise modulating 150 the reference signal to one or more additional carrier frequencies, $f_{c2} \ldots f_{cm}$. Each of the one or more additional carrier frequencies may be generated using a corresponding clock signal. The additional carrier frequencies may be coherent (using a same clock signal) or incoherent (using separate clock signals). Each of the additional carrier frequencies is not equal to $f_c$. In this way, multiple frequencies may be used to resolve wavelength ambiguity (providing range finding over a broader range). One or more additional transceivers may be used to transmit 153 the one or more additional downlink signals to the tag, and a corresponding number of additional backscattered uplink signals are received 156 by the transceiver. Each of the received 156 additional uplink signals is modulated at a harmonic of its corresponding one of the one or more additional carrier frequencies. Each of the received 156 additional uplink signals is demodulated 159 using the clock signal of the corresponding one of the one or more carrier frequencies. A distance between the tag and each additional transceiver is calculated 162 based on a difference between a phase of the reference signal and a phase of a corresponding one of the one or more demodulated uplink signals.

The intermediate frequency, $f_{IF}$, and/or the carrier frequency, $f_c$, may be selected to minimize Flicker noise and sampling jitter. For example, to minimize the Flicker phase noise, $f_{IF}$ may be chosen to be at a frequency greater than a frequency where the Flicker noise power density is equal to the thermal noise density. With regard to sampling jitter, $f_{IF}$ may be selected to be at a frequency below that at which performance is degraded by sampling jitter. Further examples are provided below.

Figure 1:
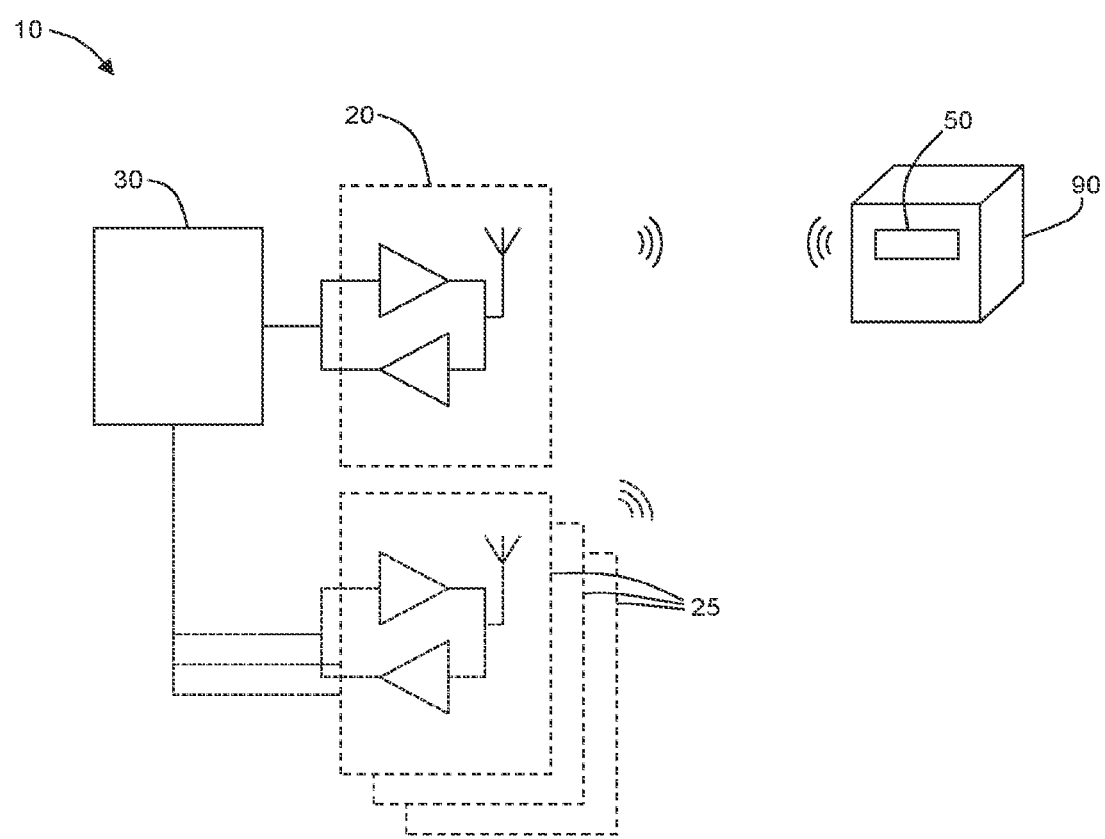
FIG. 1 is a diagram of a system for range finding an object according to an embodiment of the present disclosure.

In another aspect, the present disclosure may be embodied as a radio-frequency system 10 for range finding (see. e.g., FIG. 1). The system 10 includes a transceiver 20. The transceiver 20 is configured to modulate a reference signal having an intermediate frequency $f_{IF}$ to a carrier frequency, $f_c$. For example, the transceiver 20 may have a mixer to modulate the signal using a clock signal. The system may include a clock to provide the clock signal. For example, the clock may be a part of the transceiver or separate from the transceiver. The clock signal may be provided by a clock that is not a part of the system. The transceiver 20 is configured to transmit the downlink signal. In this regard, the transceiver may have an antenna or be connected to an antenna. The transceiver 20 is further configured to receive a backscattered uplink signal modulated at a harmonic of the carrier frequency. The uplink signal may be backscattered by a tag, such as, for example, a tag 50 attached to the object 90 of interest (an object for ranging finding). For example, the uplink signal may be modulated at the second harmonic, $2f_c$, of the carrier frequency. The transceiver 20 is configured to demodulate the uplink signal using the clock signal. For example, the transceiver may use a frequency doubler to demodulate an uplink signal modulated at the second harmonic of the carrier frequency. For example, the transceiver may have a transmitter and a receiver, both operating (modulating and demodulating) using a same clock signal. In this way, the transmitter and the receiver are coherent. The transmitter and receiver of the transceiver may be separate—e.g., without sharing a housing or circuitry. In other embodiments, the transmitter and receiver of the transceiver may in a common housing and/or share common circuitry.

The system 10 includes a signal processor 30. The signal processor 30 is in communication with the transceiver 20. The signal processor 30 is configured to receive the demodulated uplink signal from the transceiver 20, and to calculate a distance between the tag and the transceiver using a phase of the demodulated uplink signal. The signal processor 30 may be a field-programmable gate array (FPGA). The processor may include one or more modules and/or components. For example, the processor may include one or more hardware-based modules/components (e.g., an FPGA, a digital signal processor (DSP), an application specific integrated circuit, a general purpose processor, etc.), one or more software-based modules (e.g., a module of computer code stored in a memory and/or in a database), or a combination of hardware- and software-based modules.

In some embodiments, the tag 50 may form a component of the system 10. However, it should be noted that a tag may be a separate component from the system in some embodiments. The tag (harmonic tag) 50 is configured to receive the downlink signal from the transceiver 20 and to backscatter the uplink signal at a harmonic frequency of the carrier frequency. For example, the tag may be configured to backscatter an uplink signal at the second harmonic, $2f_c$, of the carrier frequency, $f_c$. In a particular example, the tag may be a passive harmonic tag configured with a non-linear transmission line (NLTL) configured to backscatter the downlink signal at a harmonic frequency. The tag may be configured to encode a digital identification onto the uplink signal. For example, the digital identification may be an identification code unique to the tag. The digital identification may be encoded using a code-division multiple access protocol. In this way, the system may be able to distinguish between multiple tags which may be present. For example, the system may be configured for range finding of multiple objects using multiple tags.

In some embodiments, the system 10 comprises one or more additional transceivers 25. Each additional transceiver 25 is configured to modulate and transmit the reference signal at a corresponding one or more additional carrier frequencies, and to receive and demodulate corresponding uplink signals. And each uplink signal is at a harmonic of a corresponding one of the one or more additional carrier frequencies.

Further Discussion and Experimental Embodiments

Figure 10:
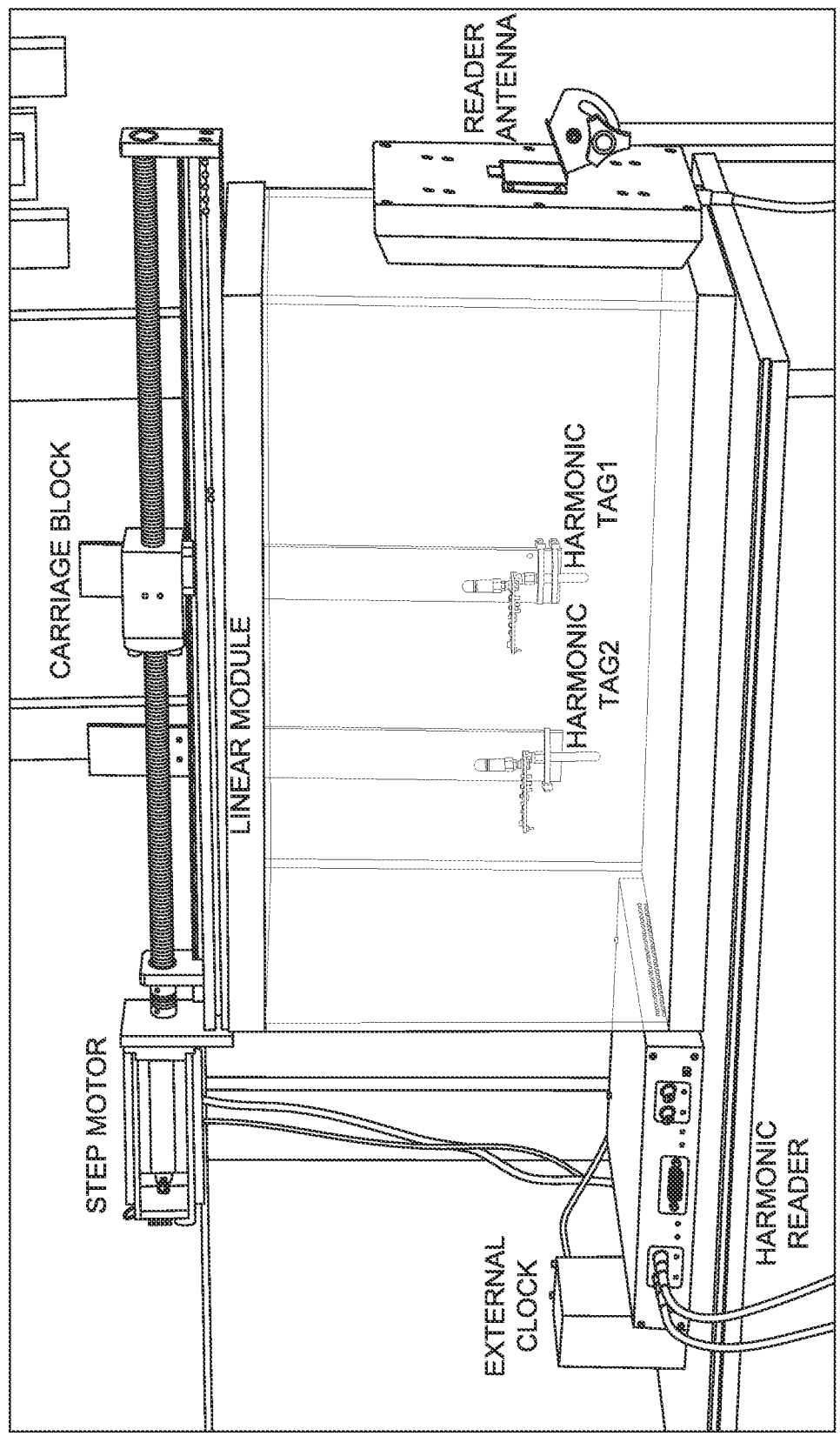
FIG. 10: A photograph of an experimental embodiment of a harmonic RFID ranging system and test platform.

An exemplary system 60 (shown in FIG. 3) was built to benchmark the performance of the presently-disclosed harmonic RFID ranging scheme. The exemplary system included a harmonic reader 62 and tag 64. A micrometer platform 66 was also provided to accurately move the tag. A photograph of the experimental setup is shown in FIG. 10. A software defined radio (SDR, Ettus X310, UBX-160) was used as the harmonic reader, and the external clock 72 was derived from a rubidium frequency standard (FE-5650A) to provide a stable frequency reference. A field-programmable gate array (FPGA) 74 was used to feed the digital signal to a digital-to-analog converter (DAC) to generate the intermediate-frequency (IF) signal, which was mixed with the downlink RF frequency (carrier frequency) of $f_c$. The Tx signal after a power amplifier and a low-pass filter (LPF) 78 was fed to a splitter 80, which was used as part of a broadband duplexer. The downlink signal (the blue arrow) was received by a harmonic tag 64, which was mounted on a carriage block 92 to provide linear motion with micrometer-level accuracy and resolution through a worm shaft. The passive harmonic tag received the downlink signal and harvested the energy to power up. The tag modulated the backscattered signal with the code-division multiple access (CDMA) protocol together with the unique tag identification, so the system was able to distinguish each tag with simultaneous multiple access. A nonlinear transmission line (NLTL) was designed on the tag to convert the backscattered signal to the second harmonic, which goes back to a reader antenna 75 and then a high-pass filter (HPF) 82 through the splitter 80. The Rx signal was amplified by a low-noise amplifier (LNA) and down converted by a local oscillator (LO) at 2f to the intermediate frequency, which was sampled by an analog-to-digital converter (ADC). The digitized intermediate frequency was processed by the FPGA and transmitted to a host computer. Because the Tx and Rx chains shared the same clock reference (indicated by the green arrows in FIG. 3), the harmonic reader was configured as a coherent transceiver.

Figure 4:
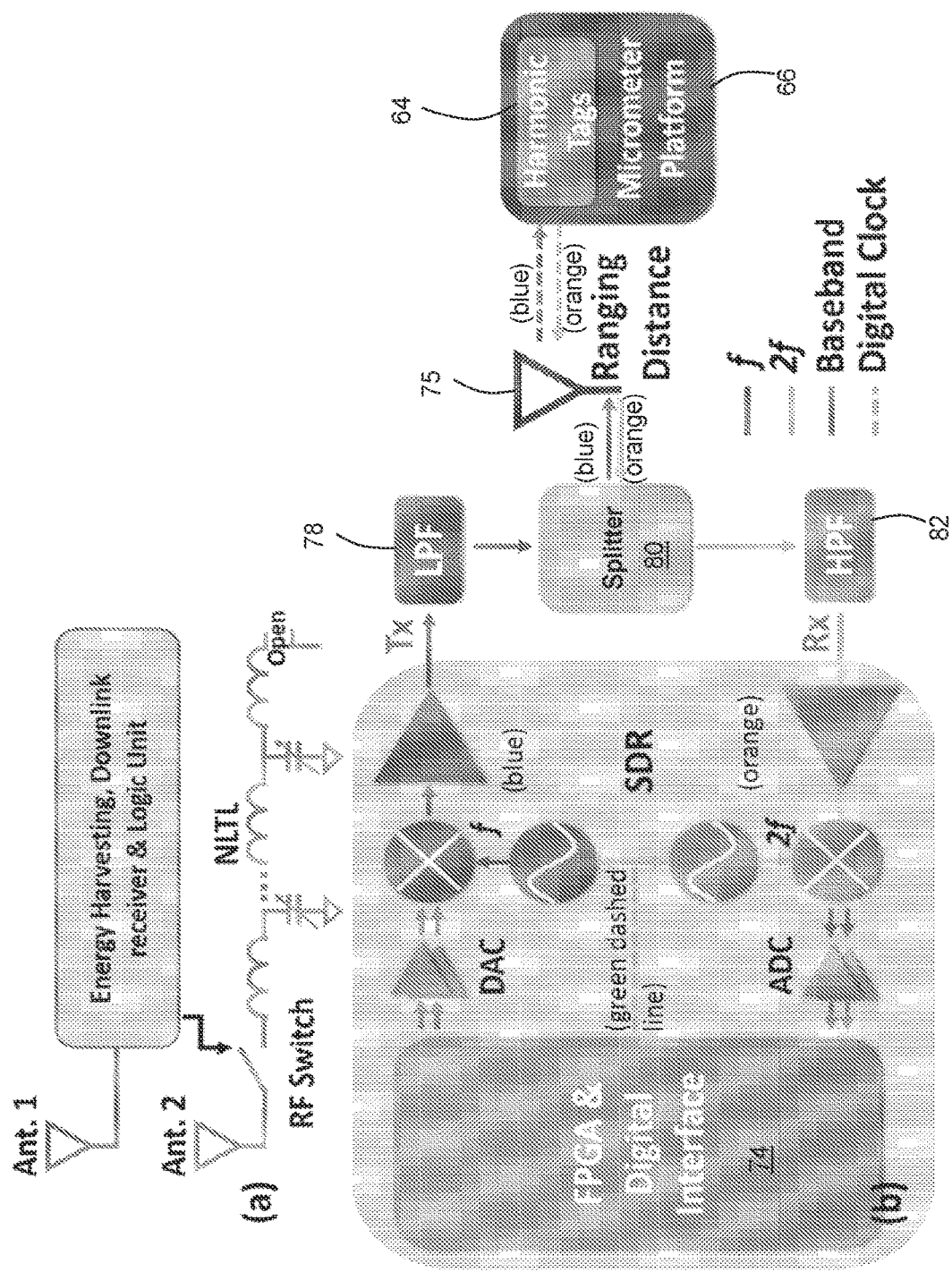
FIG. 4: (a) A diagram of the passive harmonic tag of the system of FIG. 3. (b) Another diagram of the exemplary harmonic RFID ranging system of FIG. 3.
Figure 5:
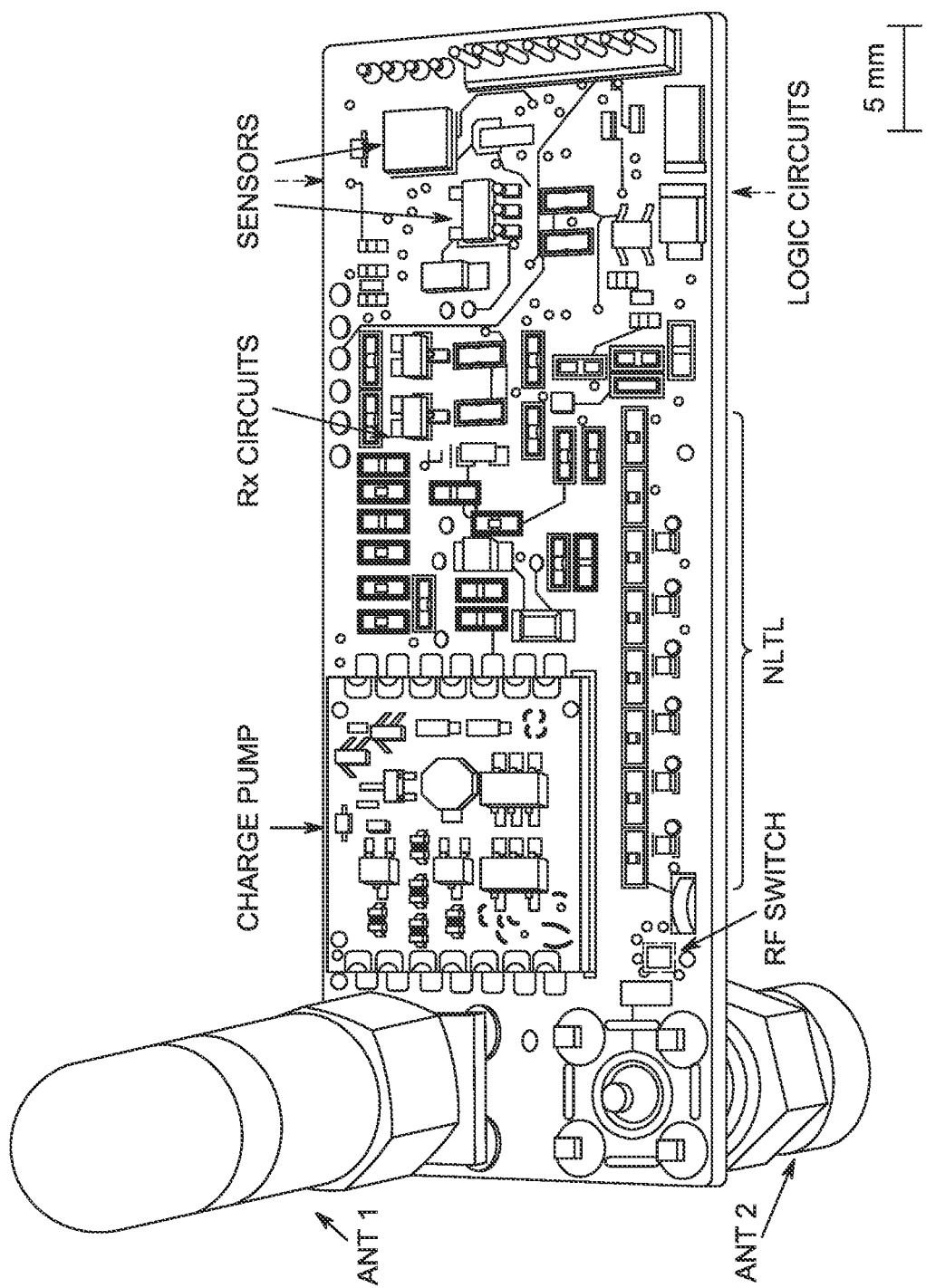
FIG. 5: A photograph of a prototype passive harmonic tag. (ANT 1: Antenna 1, Ant 2: Antenna 2, NLTL: Non-linear transmission line)

A schematic of the passive harmonic transponder is shown in FIG. 4(a), and the transponder is pictured in FIG. 5. Antenna 1 (Ant. 1) received the downlink RF signal at $f_c$. The transponder was configured to harvest the RF signal using a charge pump to power up the tag receiver and the digital logic unit. Antenna 2 (Ant. 2) also received the downlink signal and fed it to the non-linear transmission line (NLTL) to generate the $2^{nd}$ harmonic backscattering signal at $2f_c$. The other end of the NLTL was designed as an open circuit (OC), so the signal would be reflected and converted to the harmonic signal again, which increased the conversion efficiency. The RF switch before the NLTL modulated the uplink signal by on-off keying (OOK), providing the uplink baseband information.

A schematic of the whole experimental setup is shown in FIG. 4(b), and FIG. 10 is a photograph of the setup. A field-programmable gate array (FPGA) feeds a digital signal to a digital-to-analog converter (DAC) to generate an intermediate frequency (IF) signal, which is mixed with the downlink frequency at $f_c$. The Tx signal after a power amplifier and LPF is fed to a splitter, which is utilized as part of the broadband duplexer. The harmonic tag is mounted on the linear-module platform to provide motion with micrometer accuracy. The backscattering signal (orange dashed arrow) from a transponder of the tag is received at the reader antenna, and goes through a two-way splitter and a high-pass filter (HPF) to an Rx chain of the SDR. The Rx signal is amplified by a LNA and down-converted by the LO at $2f_c$ to $f_{IF}$, which is then sampled by the ADC. The digitized Rx signal (at $f_{IF}$) is processed by the FPGA and transmitted to the host computer. The same digital clock signal (green dashed line) in FIG. 4(b) is fed into two frequency synthesizers to make the SDR as the $2^{nd}$ harmonic coherent transceiver. The blue one synthesizes Tx LO at frequency $f_c$ for the downlink signal, and the orange one synthesizes Rx LO at $2f_c$. Other RF frontend methods can provide the harmonic coherent transceiver as well, such as using the nonlinearity of the power amplifier to obtain the LO signal at $2f_c$ and halving the Rx LO frequency by the divided-by-two module to serve as Tx LO. The method of using the same frequency reference here presents reasonable performance and high reconfigurability.

Figure 6:
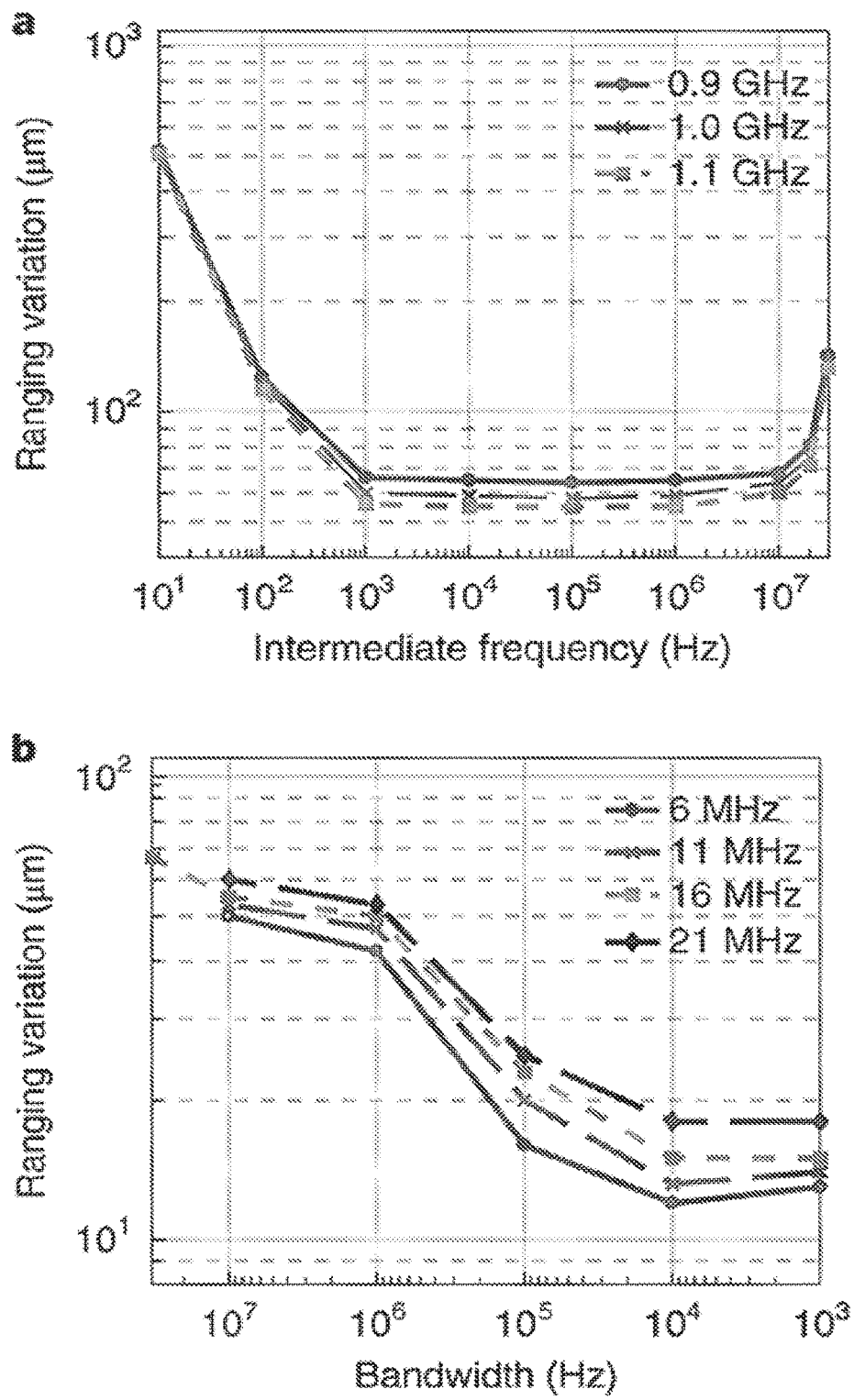
FIG. 6: The experimental results of ranging variations with respect to the frequency strategy. (a) Results with different $f_{IF}$ selections at various $f_c$ from 0.9 GHz to 1.1 GHz. (b) Results with different BWIF at various $f_{IF}$ selections from 6 to 21 MHz. (c) Results with various moving window sizes. The bottom and top edges of the box are the $75^{th}$ and $25^{th}$ percentiles of the ranging variation data, and the middle line inside the box indicates the median. The bottom and top edges of the whiskers are the minimum and maximum values of the analyzed data.
Figure 6:
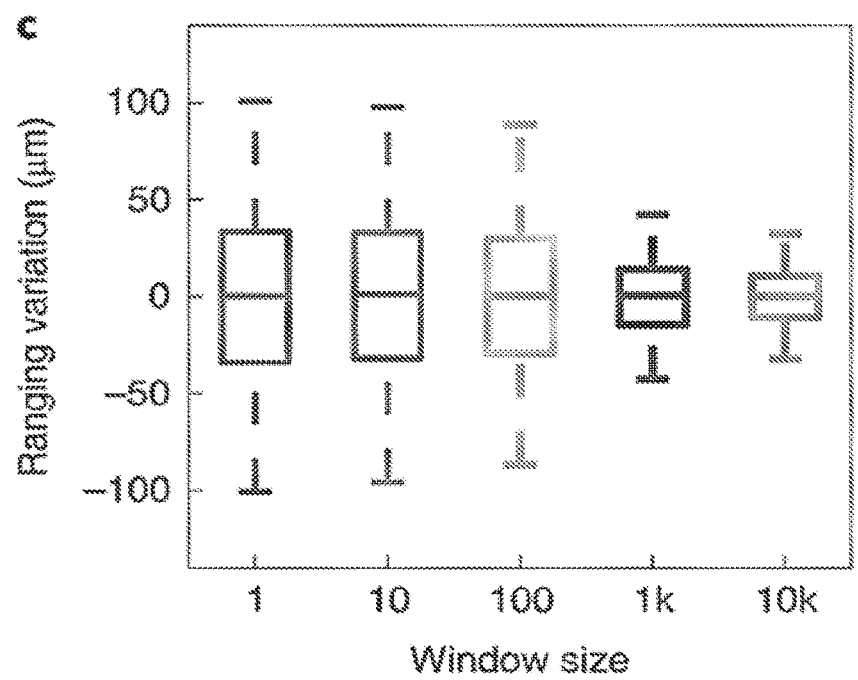

As the phase noise can be a fundamental limit for the ranging system, a technique to achieve high resolution is to employ an adequate intermediate frequency $f_{IF}$ to avoid the low-frequency Flicker noise. Before the movement of the tag was considered, the ranging performance for the static position was characterized in FIGS. 6(a)-6(c), where the ranging root-mean-square (RMS) variation versus $f_{IF}$ under $f_c$=0.9, 1.0, and 1.1 GHz is shown in FIG. 6(a), where $f_c$ is the carrier frequency. A sampling rate of the ADC was 66.7 MSps (mega-samples per second), and the intermediate-frequency filter bandwidth $BW_{IF}$ was 33 MHz. $BW_{IF}$ is related to the integration of the noise floor, with its maximum decided by the sampling rate of 66.7 MHz. When $f_{IF}$ is low, the Rx signal is close to the Rx LO frequency, so the phase noise level is high and the ranging variation is relatively large. When $f_{IF}$ increases above 10 MHz, the ADC jitter effect becomes important. The ranging variation also depends on $f_c$ in FIG. 6(a), where higher $f_c$ gives smaller ranging variation due to the shorter wavelength. FIG. 3(b) shows the root-mean-square ranging variation decreases with decreasing $BW_{IF}$ and then increases slightly with decreasing $BW_{IF}$ after $BW_{IF}$<10 kHz under $f_c$=1 GHz and the ADC sampling rate of 66.7 MSps. It can be seen that all ranging variation is below 30 μm when $BW_{IF}$ is narrower than 100 kHz, which is usually sufficient for the uplink baseband information with $BW_{bb}$<$BW_{IF}$ in passive transponders.

Because the ranging variation is related to the resolution, one of the most efficient ways to counter random noise is to apply the moving average. The ranging variation with different window sizes of 1, 10, 100, 1 k, and 10 k are shown in FIG. 6(c), with the $75^{th}$-percentile variations (top edges of the boxes) at 33.5, 30.2, 26.8, 14.1, and 10.8 μm, and the maximum variations (top edges of the whiskers) at 101.1, 96.2, 86.2, 42.3, and 32.4 μm, respectively. It can be seen that the moving average method is effective in reducing the ranging variation caused by the random parts of the phase noise and the ADC aperture jitter. The average is conducted with oversampled intermediate frequency. Within the 1 kHz ranging cycle, the number of intermediate-frequency sampling points is 66.7K, which is still higher than the 10K window size. However, further increasing the window size has only diminishing benefit in reducing the ranging variation, as shown in FIG. 6(c) for window sizes from 1K to 10K. Alternatively, when the ranging cycle and moving average window size are given, the ADC sampling rate can be correspondingly tuned down to reduce power consumption, if such a feature is desirable for the reader transceiver. It is noted that a moving average is not an essential procedure in embodiments of the present scheme if, for example, the signal-to-noise ratio (SNR) of the backscattered LoS signal is sufficiently high under the low-noise system. Therefore, the trade-off between the frequency response caused by the window size and the ranging resolution is not limited by the same uncertainty principle as in the Fourier-based methods. A detailed discussion of the ranging variation related to the system configuration is provided below.

Ranging Experimental Results and Analyses

Figure 7:
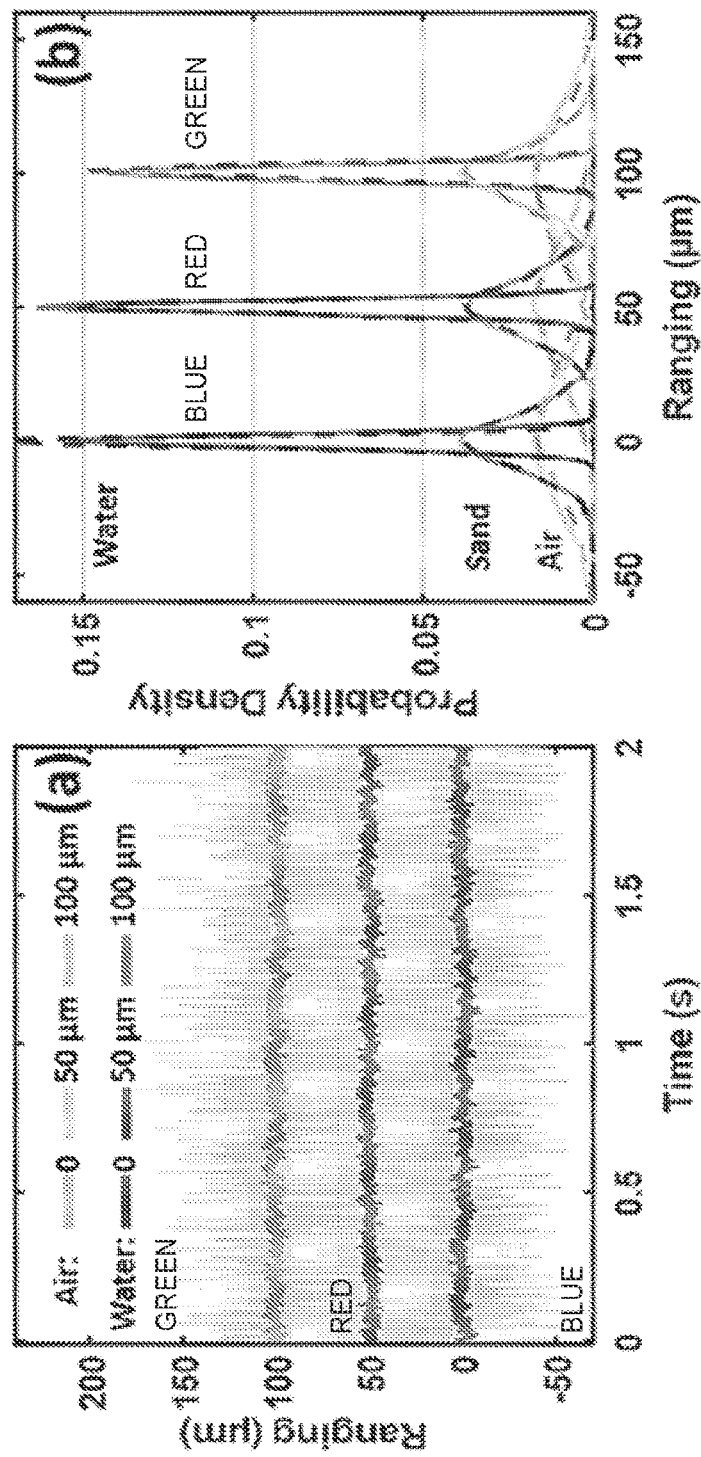
FIG. 7: Experimental results of quasi-static ranging. (a) Time-domain measurements in air and water with steps of 50 μm. (b) Probability density curves when the tag was in air, sand, and water with steps of 50 μm. The solid and dashed lines correspond to data collection within 2 s and 0.1 s, respectively. (c) Resolution analysis when the tag was in water. (d) Measurements of the 50-μm steps in air with the downlink frequencies at 0.5 GHz, 1.0 GHz, and 2.0 GHz.
Figure 7:
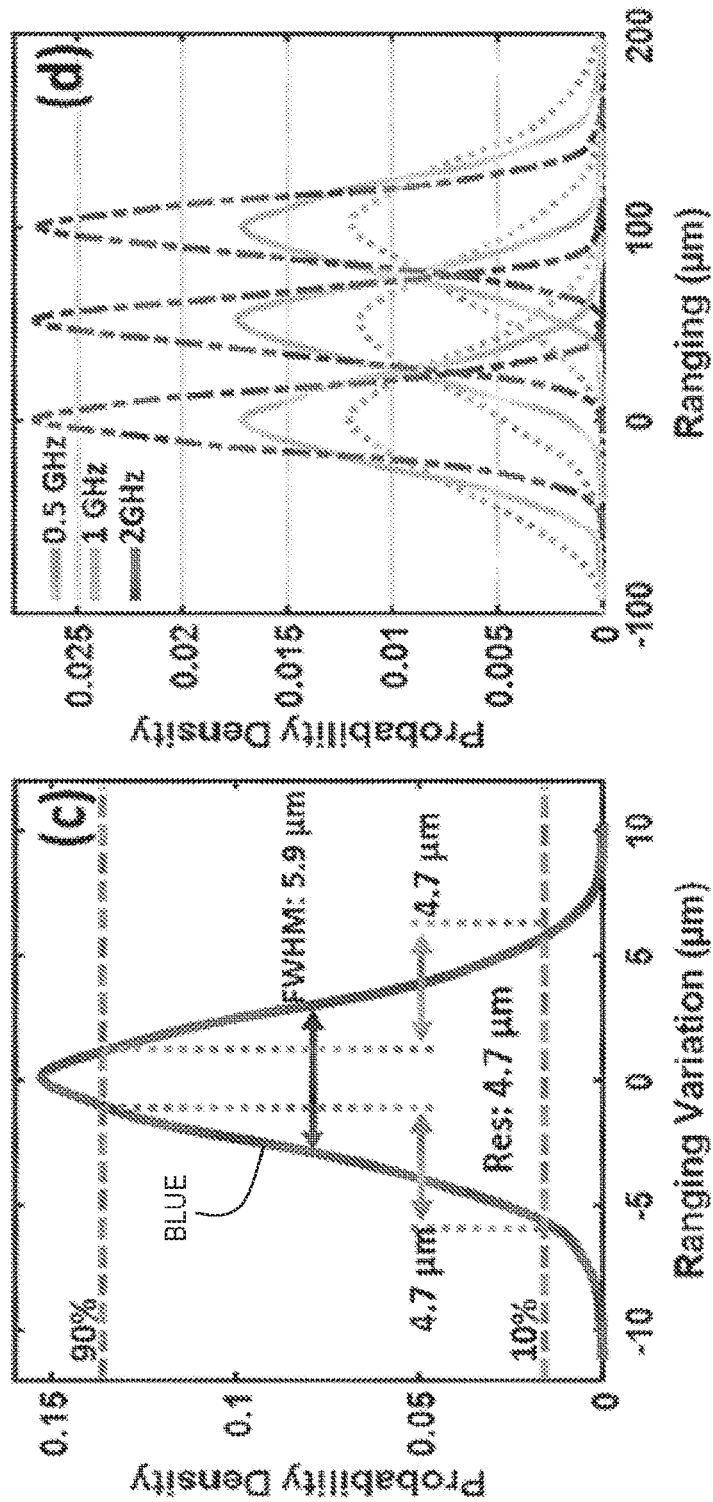

An experiment was conducted using quasi-static movement to investigate the harmonic RFID ranging resolution in different materials. A wavelength of the backscattered signal will be reduced as the medium between the tag and the reader antenna has a higher permittivity. Consequently, the phase-based range calculation can be divided by the square root of the relative permittivity ($\varepsilon_r^{0.5}=n_r$). Although the shorter wavelength results in a shorter detection range within one wavelength, this drawback can be easily compensated by the multi-frequency method discussed below. In addition, resolution is usually improved in the higher-permittivity material, which is further illustrated in FIG. 16. The experiment in FIG. 10 was conducted with the glass tank was alternatively filled with air, construction sand, and water. The initial tag position was calibrated as 0 to cancel the constant system phase offset, and then advance the carriage block to 50 µm and 100 µm. The recorded time-domain signals at the three positions of 0, 50, and 100 µm are shown in FIG. 7($a$) in blue, red, and green, respectively. The lighter color-tone curves correspond to measurements in air and the darker curves in water, where $\varepsilon_r$=79.2 was used. The wavelengths at the uplink frequency of 2 GHz are 15 cm and 1.69 cm in air and water, respectively. The downlink signal was set as 1 GHz. The equivalent sampling rate was 1 kSps (kilo-samples per second), and a 1 k moving-average window was applied. From FIG. 7($a$), the ranging measurements were fairly stable and clearly separated, and the curves in water had much higher resolution. The high permittivity of water provided not only higher ranging resolution, but also isolated the multipath interference from outside the water. However, when the tag was close to the upper water-air surface, the ranging results would be subject to interference from ambient (air-water boundary) disturbances. Similarly, for the ranging experiments in air, the ranging results will be distorted when severe multipath interference is caused by nearby moving people. The real-time experiment was also performed with a 25 µm step size in water. The tag was stepped forward three times with 25 µm, and the tag was about 30 cm away from the Rx antenna. A detailed description is provided below with respect to FIG. 15.

FIG. 7($b$) shows the ranging probability density when the tag was in air (low peaks), sand (middle peaks), and water (high peaks) at 0 (blue), 50 (red), and 100 µm (green). The solid curves correspond to 2-s data collection and the dashed curves to 0.1-s data collection, where hardly any difference can be observed. The ranging probability density in water (blue solid curve) is examined in FIG. 7($c$) in more detail to calculate the resolution. The full-width at half-maximum (FWHM) is at 5.9 µm. If the shape of the distribution is considered as the average of the rise and fall distances, the 10-90% probability then gives 4.7 µm for both rise and fall sides. With the same method, the FWHM resolutions in air and sand are 39.1 µm and 17.8 µm, respectively. A more detailed analyses is provided below with respect to FIG. 16. Furthermore, the carrier frequency can also affect the resolution as discussed above (regarding FIG. 7($a$)). Downlink signals of 0.5, 1, and 2 GHz were provided, and the tag was stepped by 50 µm in air in FIG. 7($d$). It can be seen that the higher frequency will make the ranging resolution slightly higher, but the compromise includes the shorter wavelength ambiguity and the larger attenuation at the same ranging distance.

Figure 8:
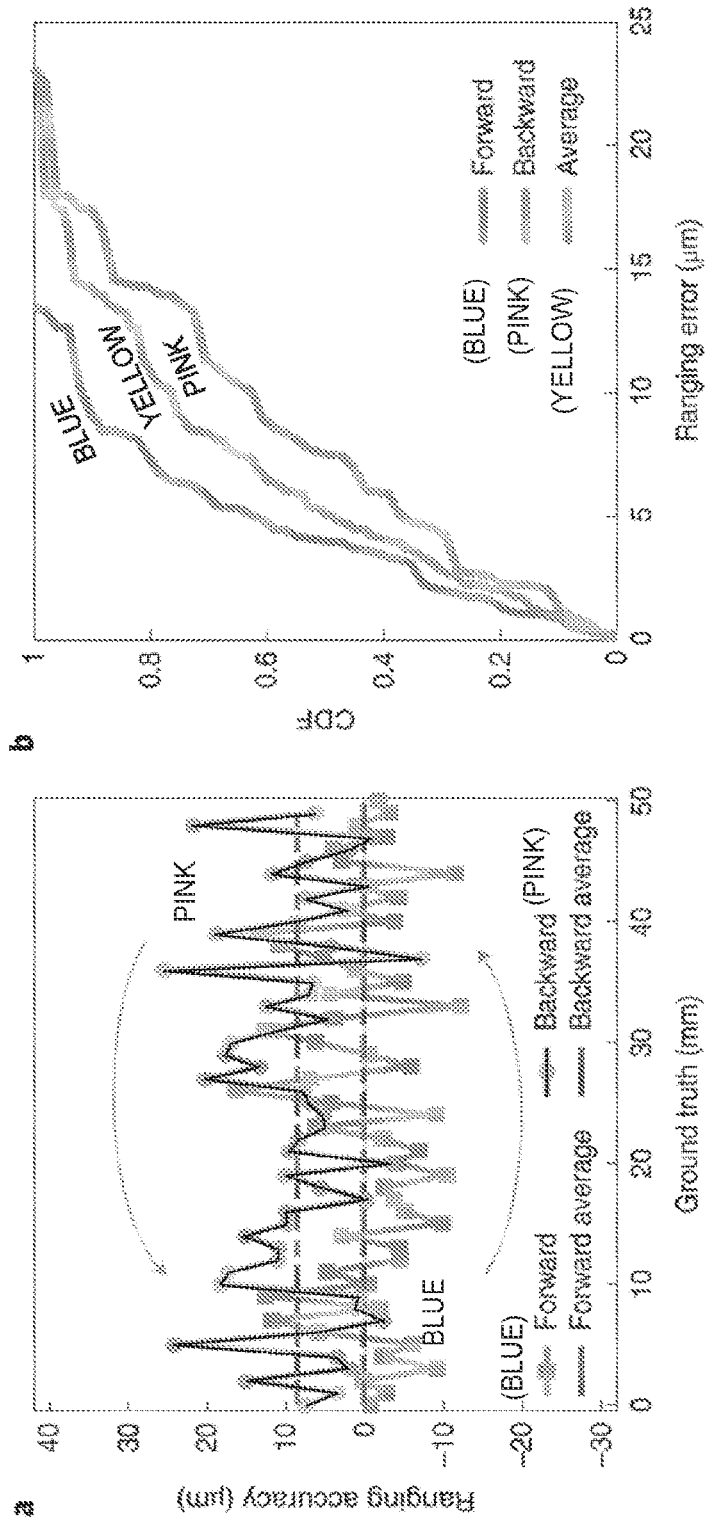
FIG. 8: Experimental results of tag movement and permittivity based on a two-tag structure. (a) The long-travel round-trip ranging accuracy with the DFCW method in water. The forward trip is in blue (line with square markers) and the backward trip in pink (line with circular markers). The average errors for the forward and backward trips are shown as dashed lines. (b) CDF of the 50-mm ranging data. (c) Real-time ranging with different tag speeds. The curves C1 to C7 correspond to a tag speed of 65.60 mm s$^{-1}$ for C1 and the successive half scaling for C2 to C7. (d) Statistical analyses of the permittivity ratio in each material measured by the two-tag structure. The bottom and top edges of each box are the $75^{th}$ and $25^{th}$ percentiles of the permittivity ratio, and the middle line inside each box indicates the median. The bottom and top edges of the whiskers are the minimum and maximum values of the analyzed data.
Figure 8:
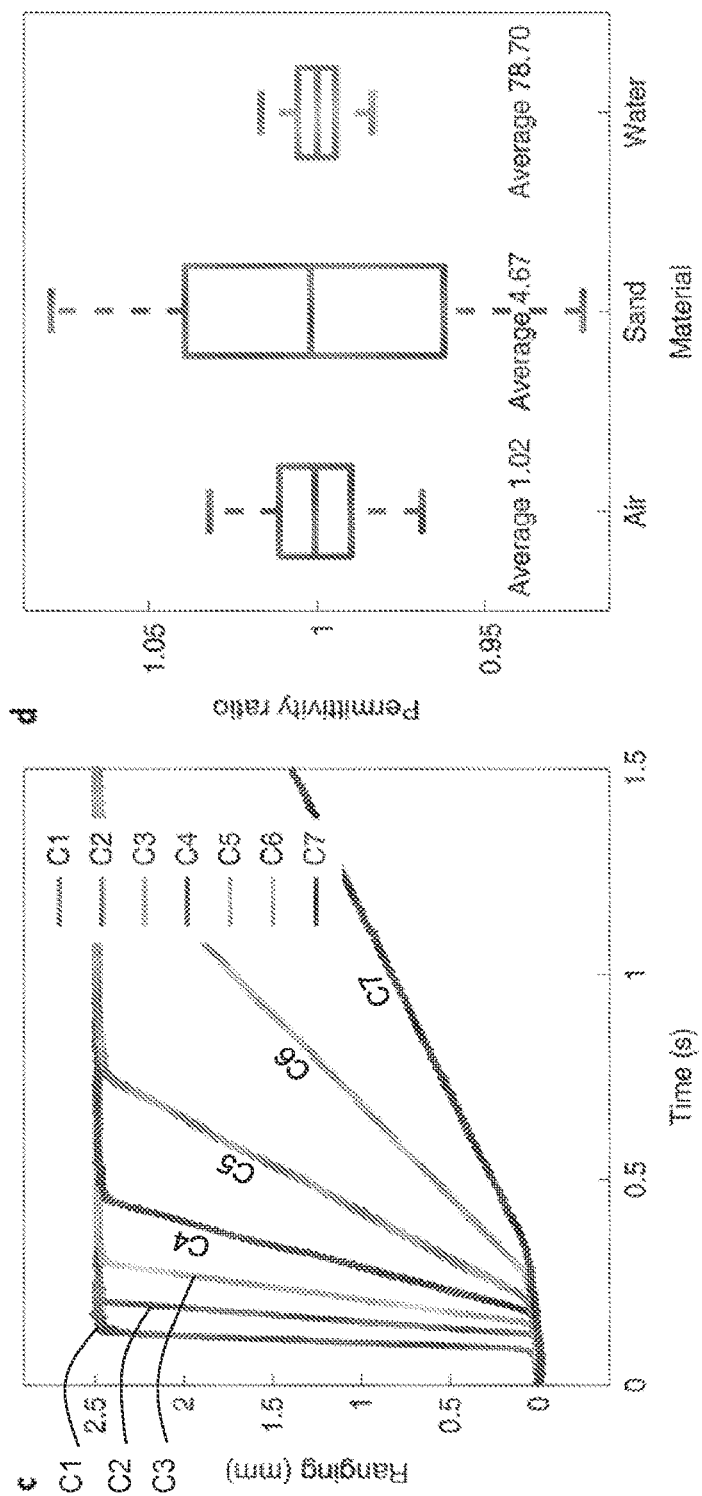

The wavelength integer from cyclic ambiguity needs to be resolved to extend the maximum operation range for the phase-based methods. Here, the dual-frequency continuous-wave (DFCW) method was used to demonstrate implementation of the range extension. Other techniques can be used. For example, sophisticated multi-frequency methods can provide more robust estimation with fewer constraints on the maximum range. Because the sensing uplink signal of the experimental embodiment was around the 2 GHz band, in air the single-frequency method can cover a distance of about 15 cm, but only 1.69 cm in water. As an illustration for extended range, the computer-control step motor drove the tag carriage forward for 5 cm in water, and backwards to the 0 point, for a travel of about three wavelengths. Based on the encoder on the step motor shaft, the travel distance monitored by the motor rotation angle was chosen as the ground truth to benchmark the ranging accuracy of the experimental embodiment, as shown in FIG. 8($a$). The square marks (forward) and circular marks (backward) denote the ranging error at every millimeter. From FIG. 8($a$), it can been see that DFCW is effective in providing accurate ranging with travel distances over several wavelengths in water. Besides, because two frequencies were applied, after resolving the wavelength integer, the final ranging result was obtained by averaging over measurements from the two frequencies, which further reduced the random noise. If multiple incoherent frequencies are used, more improvement can be expected. FIG. 8($b$) shows the cumulative distribution function (CDF) of the ranging accuracy from the 5-cm-travel experiment. The benchmark instances are extracted at every 1 mm of the ground-truth measurement. The blue and pink curves are the CDF for forward and backward tag motion, respectively. The yellow curve is the overall CDF. The ground truth may be polluted by the mechanical accuracy and structural vibration during tag movement. It can be seen that the backward curve is worse than the forward one, which may be caused by the lost motion clearance of the linear module in the backward travel. This observation is also consistent in FIG. 8($a$), where the forward average is very close to 0 and the backward average has a positive bias, as shown in the dashed lines. During these experiments, the tag antenna was about 0.4 m away from the reader Rx antenna. In view of the shorter wavelength and larger attenuation in water, it is estimated that the same SNR can equivalently operate in air at 3.5 m from the reader Rx antenna.

The temporal response of the ranging system was tested further. The step motor was configured with different speeds during a tag motion of 2.5 mm. In FIG. 8($c$), Curves 1 to 7 (C1 to C7) are the transient data with tag speeds of 65.60, 32.80, 16.40, 8.20, 4.10, 2.05, and 1.03 mm s$^{-1}$. The curves show the system could respond to the relatively fast movement without loss of accuracy. Because the tags employed the CDMA protocol for the multi-tag access, two tags with a known fixed distance could be used to evaluate the variation of the dielectric constant of the media. The two tags were mounted on the same carriage block and separated by 46 mm. When the linear module drove the tags at different positions, the relative permittivity at each position was evaluated. The averaged values in air, sand, and water are 1.02, 4.67, and 78.7, respectively. The variation normalized by the average within each media is shown in FIG. 8($d$). It can be seen that the permittivity variance of sand is much higher than those of air and water, which is most probably due to the mixture structure from varying silica grain sizes.

Similar to other ranging systems based on carrier phase information, phase errors and uncertainties caused by multipath interference play an important part in ranging accuracy and resolution. For example, a worst-case multi-path signal at an orthogonal phase to the LoS path signal with 55 dB lower magnitude can already pose a phase error of 0.1°, which is at the phase noise tolerance limit. The constant part of the phase offset can be reduced by the calibration step in a reasonably controlled indoor environment, which did not greatly contribute to the ranging errors in the experiments shown in this work. The use of a high-directivity reader antenna also helped reduce the multi-path effect by providing low antenna gain for undesirable directions (though such an antenna is not required). However, as discussed previously, when the ambient cannot be adequately controlled or the application scenarios contain large changes in the channel condition, more severe multipath interference can happen, and the ranging system may need to be adapted with broader bandwidth antennas with high directivity and/or a stable phase center, and/or more sophisticated algorithms, possibly with a compromised ranging accuracy and resolution. Moreover, in addition to the frequency reference factors discussed herein, which can limit the ranging performance, some other hardware aspects may need to be considered as well in the system setup. For example, large signal-power dynamic range due to large coverage of the operation distance may need to be adaptively compensated by improved tag and reader designs to reduce the variations in harmonic conversion by the nonlinear element.

Methods

Figure 3:
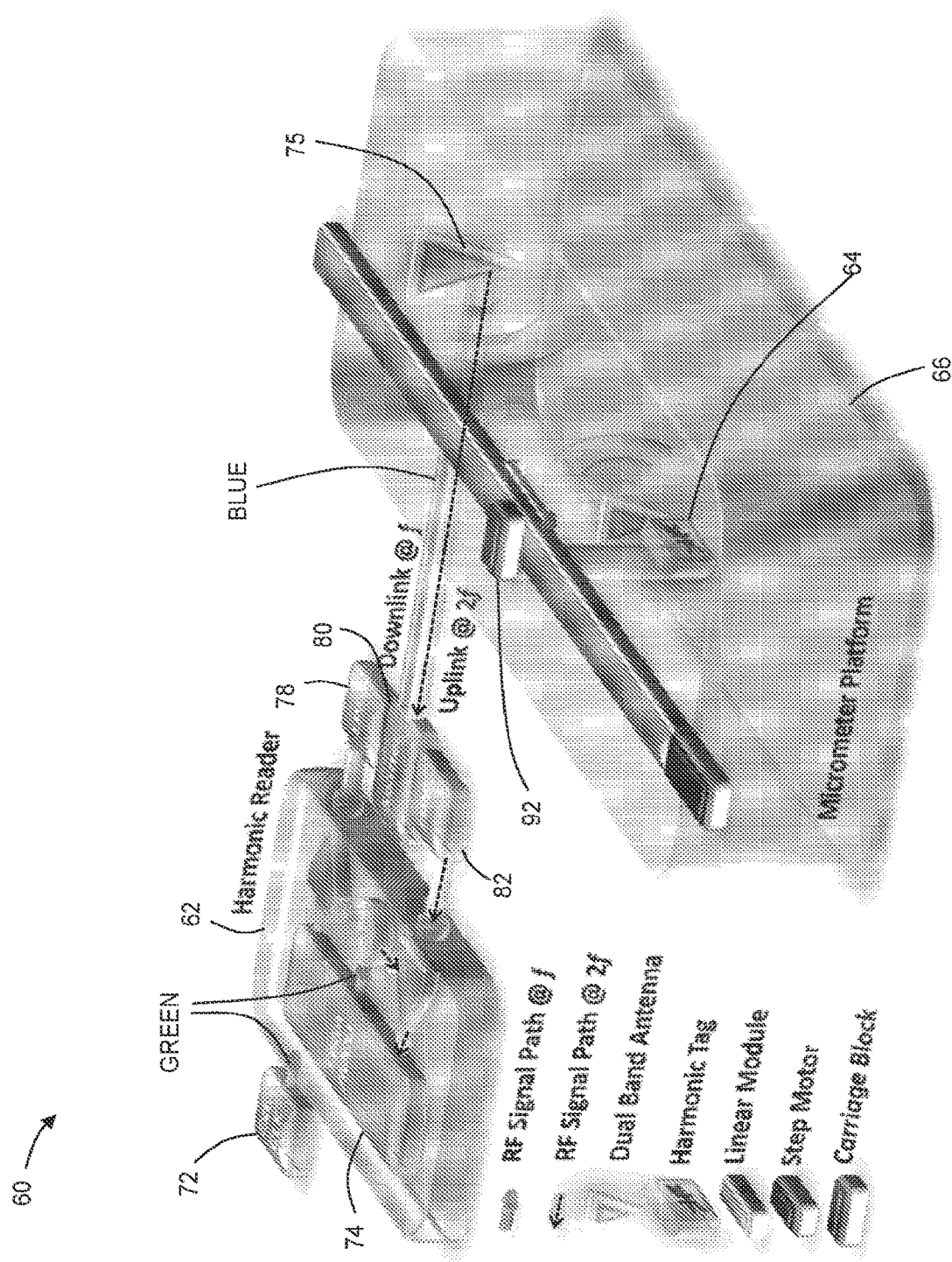
FIG. 3 is a diagram of an experimental embodiment of a harmonic RFID ranging system according to the present disclosure. The system comprises a harmonic reader and tag, and the system is shown with a micrometer platform. The reader is connected to a dual-band antenna, which transmits an interrogating signal and then receives a backscattered signal from the harmonic tag. A demodulated and digitalized signal is then sent to a processor to calculate ranging information. (FPGA: field-programmable gate array, MCU: micro control unit, LPF: low-pass filter, HPF: high-pass filter)

As shown in FIG. 3 and FIG. 10, in a non-limiting, experimental embodiment, the harmonic reader was implemented using an SDR (Ettus X310 and UBX 160 MHz RF daughter boards). The SDR was controlled by a computer with LabVIEW and was connected to the computer via PCIe cable to provide a broad data bandwidth. The sampling rates of the DAC and ADC are both configured at 66.7 MSps (mega-samples per second). In the software, the LO of Rx is set as twice that of the LO of the Tx, so the SDR is configured as a coherent harmonic transceiver. The external clock is provided by a rubidium frequency standard (FE-5650A, frequency stability: +10−11, phase noise: −100 dBc at 10 Hz, −125 dBc at 100 Hz, and −145 dBc at 1 kHz), giving the 10 MHz sinusoidal wave reference. According to the X310 specification, the square wave can provide a more stable clock reference, so the system performance can be further improved by using a better clock source. The harmonic tag PCB (printed circuit board) prototype is based on the open-source WISP (wireless identification sensing platform). NLTL is implanted on the tag to generate the second-harmonic signal, which is a ladder structure of inductors and varactors. NLTL provides high harmonic conversion efficiency over broad bandwidth even when the received signal is weak. Other frequency doublers can also be applied with passive or active tag designs. In the small-signal regime with the tag impinging power less than 0 dBm, the dependence of the backscatter phase shift on the power level is negligible. However, when the impinging power to the tag is much higher (above 10 dBm), there would be a noticeable power-dependent phase shift, which can be mitigated by adding a power limiter on the tag or adaptive reader Tx power design. The tag is mounted on a wooden slab, which is then connected to the carriage block of the linear module driven by the step motor. The motor controller is connected to the computer through the real-time controller area network (CAN) bus, where the motor status can be recorded by the computer. The bit rate on the CAN bus is set at 1 Mbps (megabits per second). When the experiments were conducted in sand or water, the tag circuits were connected through RF cables to the antennas immerged in the test media. A 25-μm-step experiment was performed. During the experiments, the surroundings of the setup were reasonably controlled to avoid very strong RF reflections, platform vibration and excessive movement of people. The room temperature is controlled at about 20° C. In some embodiments, wavelength integer ambiguity and/or multipath effects can be further mitigated by techniques such as frequency diversity, channel coherence, and/or angle-of-arrival (AoA) variation. When the experiments were conducted with sand or water in the tank, the reader and tag antennas would be detuned with different gain and phase offset, where we used one calibration point (denoted as position 0) to cancel the initial phase offset. When the tag under test moved within the given media but the reader antenna remained stationary with respect to the other boundaries of the setup, this calibration was sufficient for all subsequent ranging measurements. However, unknown inhomogeneity in the media, direct blockage of LoS, and reader location changes without new calibration will make our present system fail in terms of its performance in precision and accuracy, similar to other RF methods.

Additional Discussion

Figure 9:
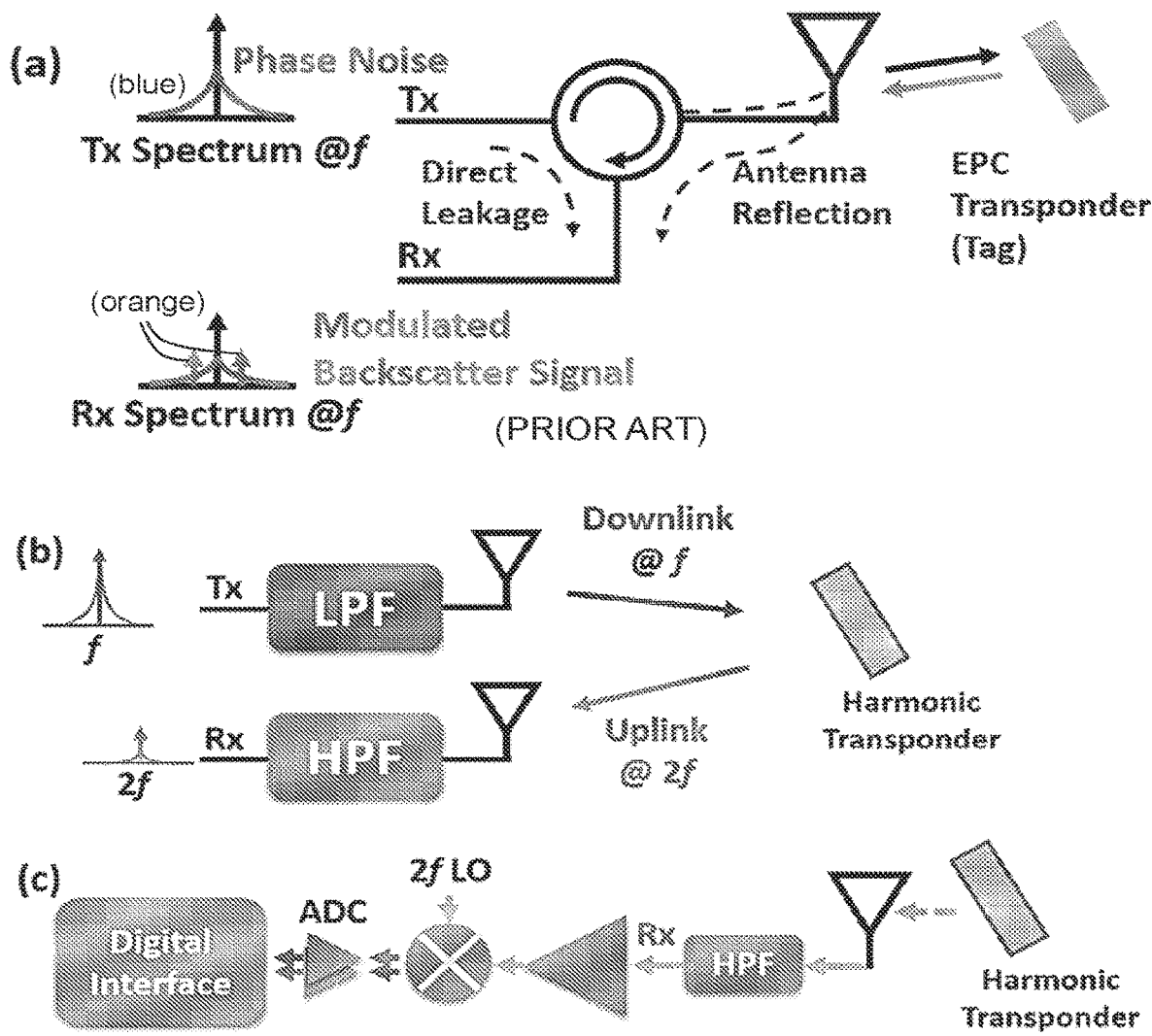
FIG. 9: A backscattering UHF RFID system. (a) A block diagram of a conventional RFID system, where phase-based ranging would suffer from the high noise skirt of the Tx signal through direct leakage and antenna reflection to Rx. (b) A block diagram of a harmonic system with high Tx and Rx isolation according to an embodiment of the present disclosure. (c) A diagram of an Rx signal chain of a harmonic receiver according to an embodiment of the present disclosure.

The phase information of the RF backscatter signal can offer accurate ranging of the transponder tag, which modulates its identification (ID) code on the RF signal to differentiate against other non-specific ambient reflection and inter-tag interference. The phase noise and transmitter/receiver (Tx/Rx) synchronization hence determine the ranging accuracy. The conventional EPC Gen2 (electronic production code generation 2) RFID system however suffers high phase noises. As shown in FIG. 9(a), the Tx spectrum is around $f_c$. The phase noise of the Tx signal is shown as the blue skirt around the injected local oscillator (LO) carrier. Because of the limited isolation of the circulator, the antenna reflection and the nearby ambient reflection, the Tx signal leaks to Rx at the same $f_c$. The backscattered signal from the tag is modulated, so the spectrum is slightly offset from the carrier frequency, shown as the double sideband (DSB, orange arrows) on the Rx spectrum. Constrained by the double-trip path loss and available scavenged power of the passive tag, not only the amplitude of the tag signal at Rx is weak, but the DSB frequency offset is also small with low base bandwidth. On the other hand, the reader needs to transmit relatively high power to wake up the passive tag, increasing the overall power level of the phase noise skirt. As most LO specification has the phase noise in dBc, i.e., normalized to the carrier power, the received backscattered signal will often suffer very high noise level from the low signal-to-interference ratio (SIR). To solve this problem, a harmonic backscattering system is employed, as shown in FIG. 9(b). The Tx signal spectrum is around $f_c$, transmitted through the Tx antenna after the low-pass filter (LPF) to the harmonic transponder as the downlink. The harmonic transponder receives and harvests the downlink signal at $f_c$, which is also converted to the $2^{nd}$ harmonic signal at $2f_c$ as the backscattering uplink to be received by the reader Rx antenna. As $2f_c$ is far away from $f_c$, so the phase noise skirt of the high-power Tx signal is no longer the main noise source. FIG. 9(c) shows the Rx signal chain of the harmonic receiver. The signal goes through the high pass filter (HPF) and then amplified by the low noise amplifier (LNA). The $2f_c$ LO is synthesized from the same clock source of the Tx LO and is hence coherent to Tx. After the mixer, the down-converted quadrature signals are digitized by the analog-to-digital converter (ADC), and passed to the digital system for further processing.

Figure 11:
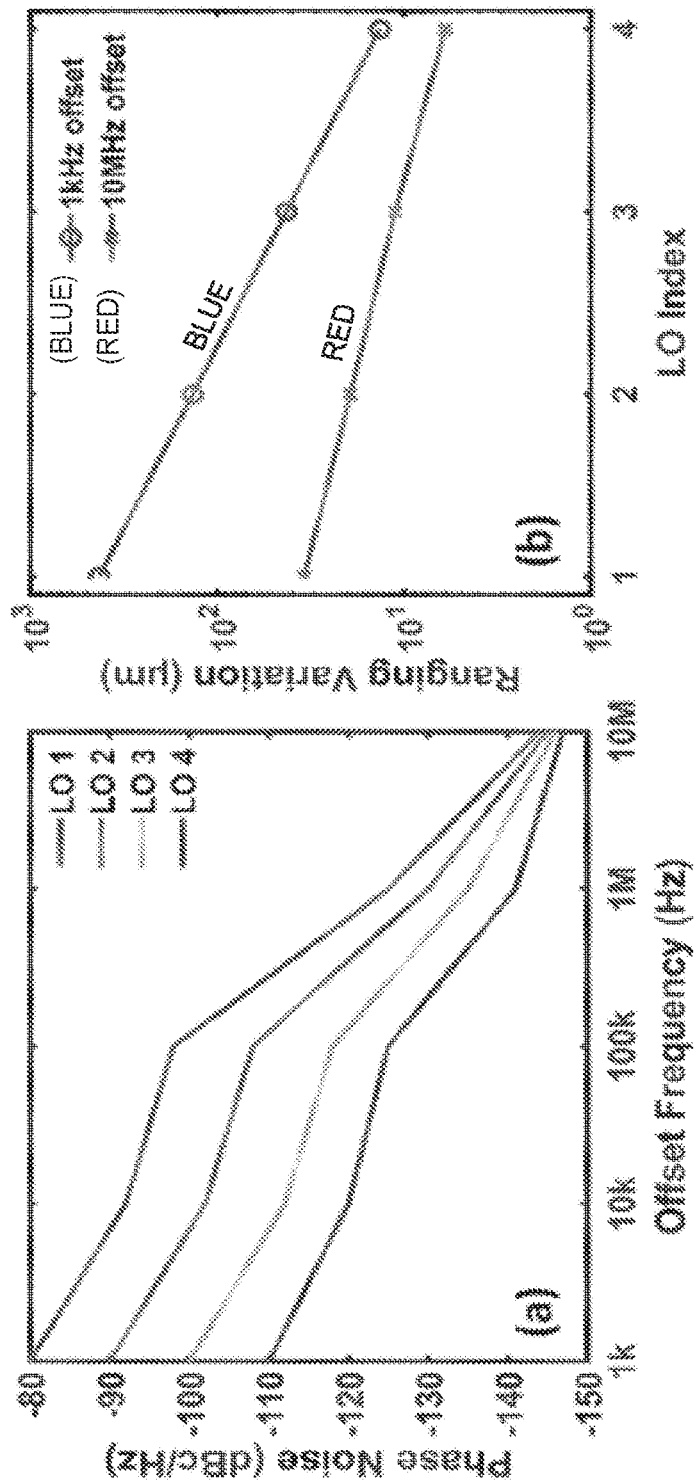
FIG. 11: Simulation results of RMS ranging variations under different local oscillators (LOs). (a) Phase noise curves of four LOs at 1 GHz. (b) Ranging variations caused by phase noise with 1 kHz offset (blue), and with 10 MHz offset (red).

Accurate phase retrieval is advantageous for phase-based ranging, which is affected by the LO performance in addition to external phase noise. FIG. 11(a) shows four phase-noise curves of different LOs. LO 2 is the phase noise curve close to 1 GHz synthesized from the atomic clock reference applied in other experiments. Others are the phase noise curves with worse (LO 1) and better (LOs 3 and 4) performance for comparison. The phase noise can also be expressed as the phase jitter, which is usually described as the zero-crossing jitter. The root mean square (RMS) phase jitter can be evaluated by $$\phi_{jitter} = (2 N_p \cdot BW_{bb})^{1/2} \tag{1}$$

where $N_p$ is the noise power density and $BW_{bb}$ is the base bandwidth. When LO is at 1 GHz, the second harmonic is at the 2 GHz with the free-space wavelength of 150 mm. FIG. 11(b) is the RMS ranging variation with each LO under the down-conversion frequency offset $f_{offset}$=1 kHz (blue) and 10 MHz (red), when $BW_{bb}$ is set to 1 kHz. It is clear in FIG. 11(b) that better LO phase-noise performance can provide smaller ranging variation, which can also be achieved by larger foffset. We can see that LO 1 with $f_{offset}$=10 MHz is still better than LO 3 with $f_{offset}$=1 kHz. As seen from Eq. (1), the phase jitter increases with increasing $BW_{bb}$, and will also result in larger ranging variation.

Figure 12:
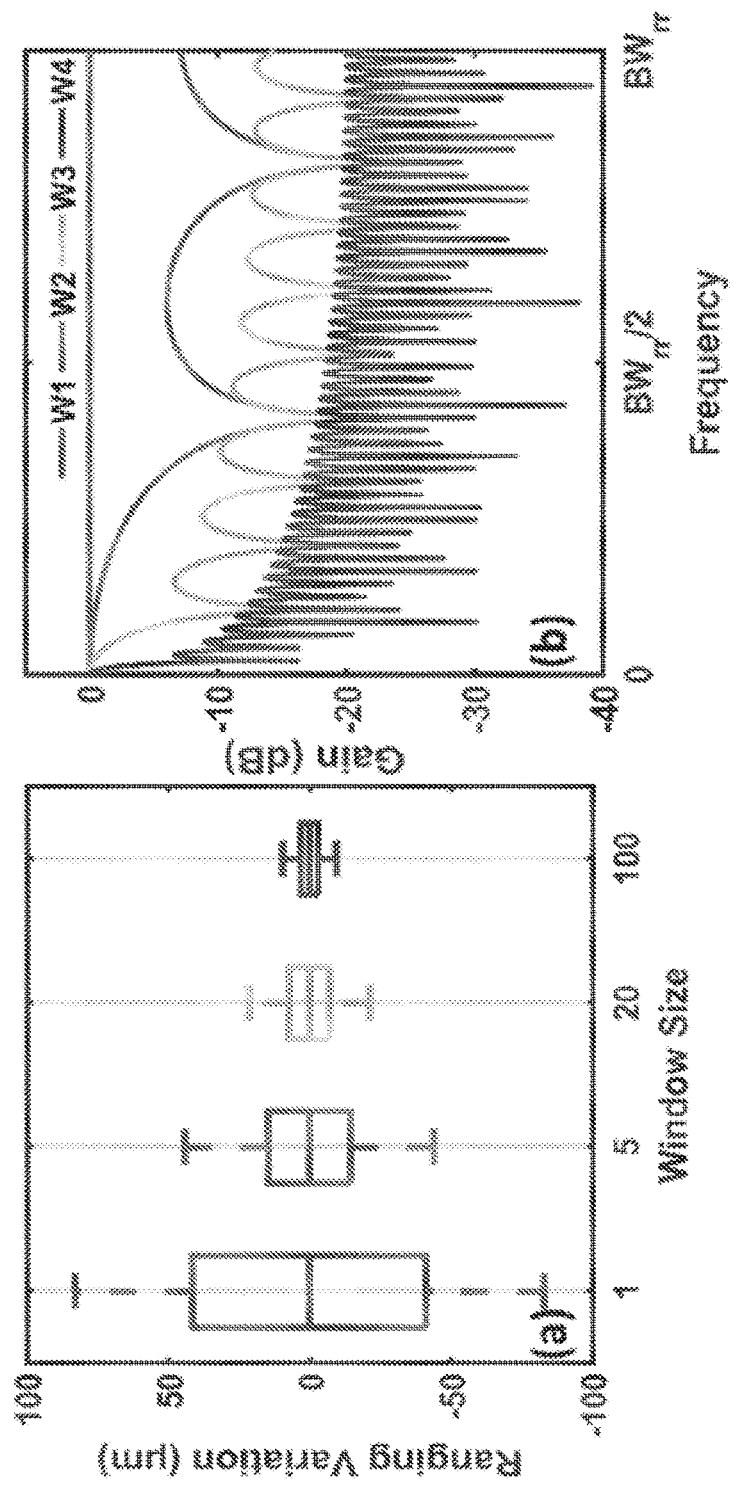
FIG. 12: Simulation results of reducing the ranging variation by different moving average window sizes. (a) Ranging variation with windows W1 to W4 at 1, 5, 20, and 100, respectively. (b) The corresponding frequency response under each window size.

When $BW_{bb}$ is much smaller than $f_{offset}$, the phase noise spectrum can be regarded as evenly distributed. To mitigate the ranging variation caused by the phase jitter under this condition, a moving average can be helpful towards a white-noise spectrum. FIG. 12(a) shows the effect of the window size in moving average with $f_{offset}$=10 MHz (LO 2) and $BW_{bb}$=200 kHz. The simulated ranging variations under four window sizes of 1, 5, 20, and 100 are 41.4, 14.8, 7.3, and 3.2 µm at the $75^{th}$ percentiles, and 82.9, 74.4, 40.7, and 17.7 µm at the maximum, respectively. We can clearly see that moving average is effective to reduce the ranging variation caused by the white phase jitter. The moving average may be equivalent to a low-pass finite impulse response (FIR) filter. The penalty of applying a broader window width is the limiting ranging frequency response $BW_{rr}$, which is equal to half of the ranging sampling rate. FIG. 12(b) shows how $BW_{rr}$ affects the frequency response of each window size. We can see that when the window size increases, the ranging variation is reduced but $BW_{rr}$ also decreases. However, the ranging sampling rate can be easily maintained above several kHz as the ADC (analog-to-digital converter) is often in the MHz level. Moving average provides more efficient computation than the digital filter. For example, an $n^{th}$-order digital FIR filter will need at least n multiplication-addition operations for each real-time cycle (e.g., sub milliseconds for kHz sampling), which can be a significant computation cost especially when the locating system employs the multi-static structure (multiple Tx/Rx pairs), large numbers of transponders, and multiple frequencies for wavelength ambiguity resolution. In moving average, it is not necessary to first calculate the sum within the window and then obtain the average. In practical implementation, computation can be much reduced. Suppose the window width is m, the system buffers the initial m data in a FIFO (first in first out) queue, and calculates an initial sum value. In each sampling cycle, the system obtains a new ranging entry, adding it to the sum value, and stores it into the FIFO. The output of the FIFO is the oldest ranging entry, which is subtracted from the sum value. Then, the moving average can be obtained by a simple division. After the first m cycles, the output rate becomes stable for every sampling cycle. The total operations in one cycle are 2 floating-point additions and 1 multiplication, which can be easily operated in real time for the multichannel, multi-frequency and multi-transponder system.

Figure 13:
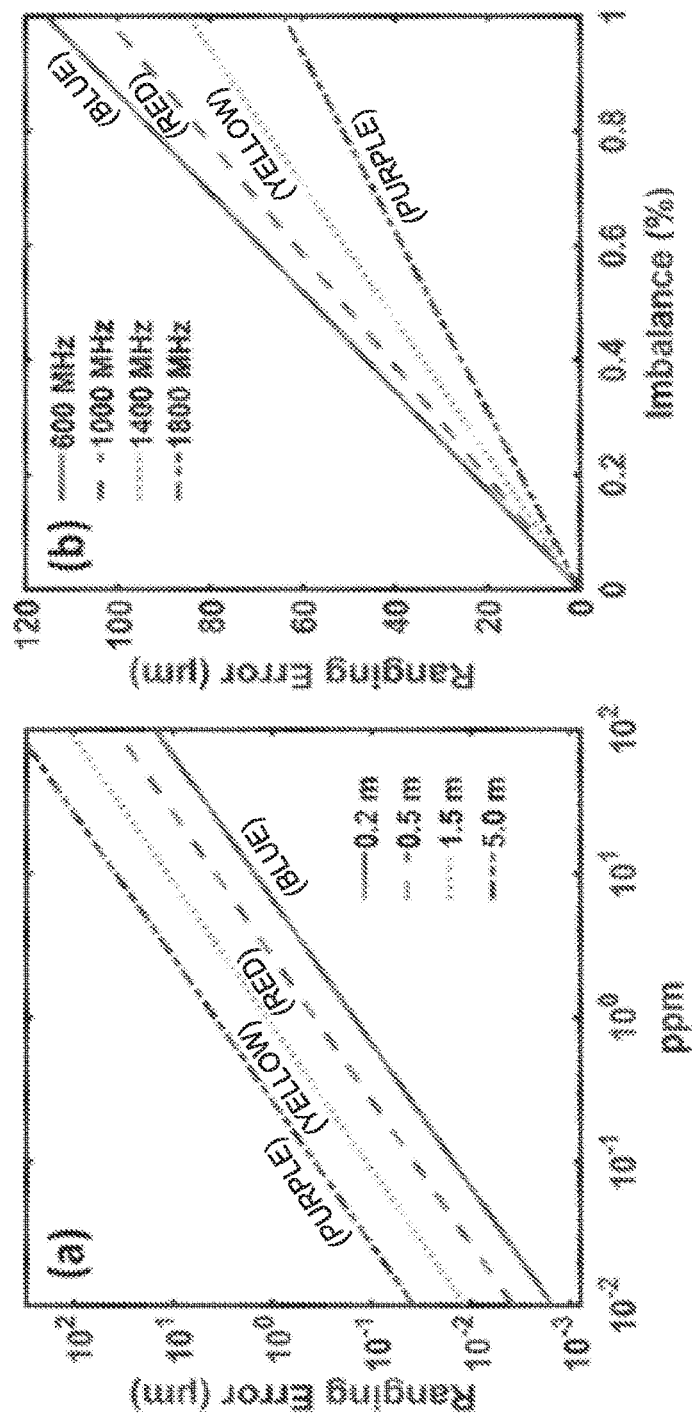
FIG. 13: Simulation results of the ranging error caused by the frequency inaccuracy and IQ imbalance. (a) Ranging error caused by the frequency inaccuracy where the error also accumulates with the distance. (b) Ranging error caused by the IQ imbalance at different frequencies.

For RF ranging, the carrier frequency $f_c$ can be utilized to calculate the wave number or wavelength. Inaccurate $f_c$ in the hardware system will directly introduce a ranging offset, which also accumulates along the ranging distance. In the LO specifications, ppm (parts per million) or ppb (parts per billion) describes the frequency inaccuracy. The ppm deviation can be converted to the maximum frequency difference by Eq. (2):

$$df = \frac{f_c \cdot ppm}{10^6} \tag{2}$$

where df is the maximum frequency difference. The ranging errors under 0.2 meters (the blue solid line), 0.5 m (the red dashed line), 1.5 meters (the yellow dotted line), and 5 m (the purple dash-dotted line) with respect to LO inaccuracy in ppm are shown in FIG. 13(a). The error accumulation along the ranging distance can be seen. Usually the crystal oscillator with low phase noises provides accuracy around 50 ppm. When the downlink carrier frequency is 1 GHz, the ranging errors are 7.5, 19, 56, and 185 µm for the ranging distances of 0.2, 0.5, 1.5, and 5.0 meters, respectively. The ranging error can be greatly reduced with improved LO performance. A good oven-controlled crystal oscillator (OCXO) can provide accuracy around 0.2 ppm, so the ranging errors of those 4 ranging distances become 0.03, 0.075, 0.225, and 0.75 µm, where LO inaccuracy will not contribute to the overall variation because the phase noise in FIG. 11 will dominate. Hence, the system design may advantageously balance the LO phase noise and frequency accuracy to achieve the higher precision with the reduced cost. The receiver is designed with the quadrature structure, where the phase is calculated from I/Q (in-phase/quadrature). In the hardware design, the received signal is split to two RF mixers for down conversion, and sampled by two ADC's. The imbalance of the I/Q signal is another frequency-related ranging error source. FIG. 13(b) shows the ranging errors caused by the I/Q imbalance with different downlink carrier frequencies. It can be seen that even though the imbalance is just about 1%, the ranging error of 600, 1000, 1400, and 1800 MHz can be as high as 115, 102, 85, and 64 µm, respectively. Hence, improved results can be obtained with the I/Q imbalance calibration, which can be done using the processor.

Figure 14:
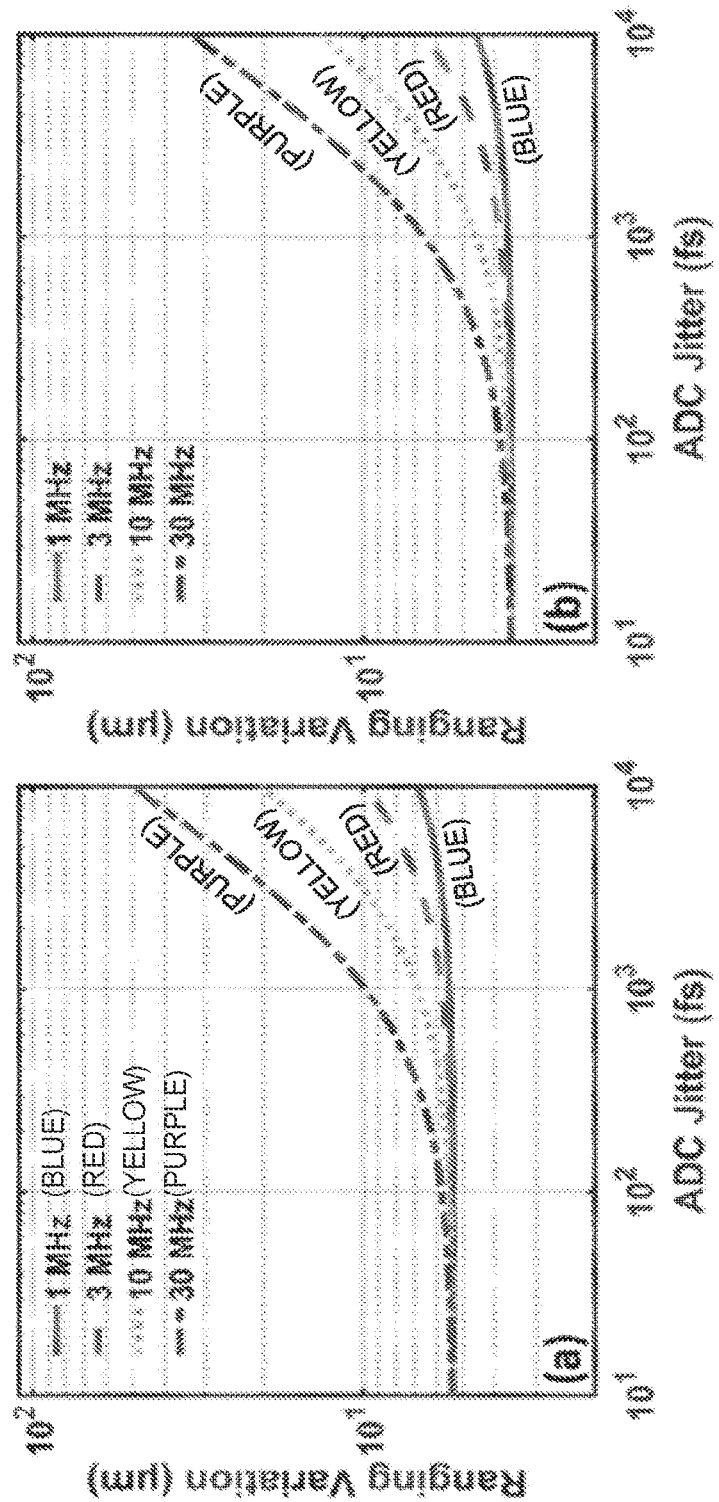
FIG. 14: Root-mean-square (RMS) ranging variation caused by analog-to-digital (ADC) RMS aperture jitter. Signal-to-noise ratio, SNR$_{ADC}$, is set as 73 dB. (a) Downlink $f_c$=1 GHz, and $f_{IF}$=1 MHz (blue solid), 3 MHz (red dashed), 10 MHz (yellow dotted), and 30 MHz (purple dash dotted). (b) $f_c$=1.5 GHz with the same $f_{IF}$ condition.

To make the system versatile with undemanding filter design, IF sampling is introduced, where the I/Q signals sampled by the ADC are not at the DC band. In realistic scenarios, the ADC clock aperture jitter should also be considered, which causes additional ranging variation. The ADC aperture jitter is usually described in the time domain. The digitized signal phase variation and the resulting ranging error depend on the input signal frequency. The ranging variation dR caused by the ADC jitter and the SNR of the ADC, $SNR_{ADC}$, can be described as:

$$dR = \left(t_{jitter} f_{IF} + \frac{10^{\frac{SNR_{ADC}}{-20}}}{2\pi}\right)\lambda_h \quad (3)$$

where $t_{jitter}$ is the ADC clock jitter (in second), $f_{IF}$ is the IF frequency sampled by the ADC, and $\lambda_h$ is the wavelength of the uplink carrier. FIG. 14 shows the RMS ranging variation caused by the ADC RMS aperture jitter with various $f_{IF}$ choices. $SNR_{ADC}$ is constant at 73 dB. When fIF is fixed, the ranging variation increases with the ADC jitter. When the ADC jitter is constant, the ranging variation depends on $f_c$ and $f_{IF}$. For the ADC used in our SDR platform, the aperture jitter is around 200 femtoseconds (fs) to 1 picosecond (ps). FIGS. 13(a) and 13(b) are the simulation results with the downlink frequency of 1 GHz and 1.5 GHz, respectively. Under the same SNR condition, higher $f_c$ provides better ranging variation due to shorter $\lambda_h$. However, $SNR_{ADC}$ in hardware usually degenerates when $f_c$ is higher, which would then increase ranging variation. The ranging variation caused by the ADC aperture jitter can be mitigated by the same moving-average procedure described before.

Figure 15:
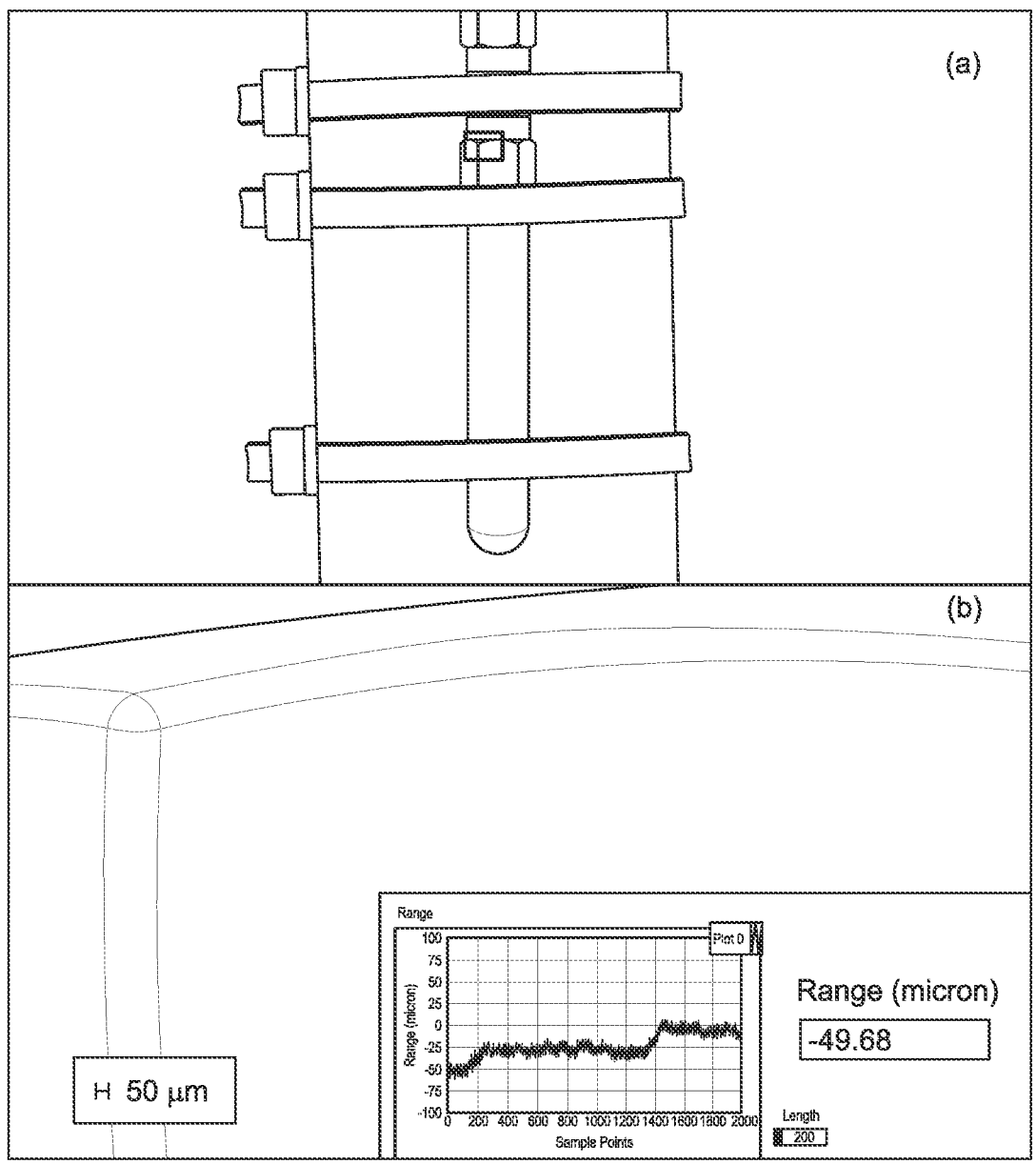
FIG. 15: (a) A photograph of a tag antenna in water in an experimental embodiment. (b) A photograph taken during the experiment using the embodiment of FIG. 15(a), wherein the main photograph shows the part of the antenna connector shown in the red boxed area of FIG. 15(a).

FIG. 15 shows the tag antenna in water when the experiments were conducted. FIG. 15(a) is the photograph of the tag antenna. Because the 25-μm movement is too small comparing to the size of the antenna, a 60-mm (full-frame equivalent) macro lens was applied to magnify the image. After the digital zoom-in, the white-boxed area in FIG. 15(a) is shown in FIG. 15(b). The high-contrast vertical edge of the connector was used as the moving marker, and a 50-μm scale bar was added close to the vertical edge (the white box in FIG. 15(b)) to clearly illustrate the moving steps. The round shape bubble on the connector in FIG. 15(b) is an air bubble.

The high permittivity of the media can enhance the ranging resolution. As shown in Eq. (4), the measured ranging distance change is $\Delta D_m$, which is related to the phase change $\Delta\phi D$ caused by tag movement distance AD and media permittivity $\varepsilon_r$, phase change $\Delta\phi n$ caused by hardware noise, and the wavelength in the media $\lambda_{\varepsilon_r}$.

$$\Delta D_m = \frac{\Delta\phi_D(\Delta D, \sqrt{\varepsilon_r}) + \Delta\phi_n}{2\pi}\lambda_{\varepsilon_r} \quad (4)$$

Equation (4) clearly shows the linear relationship of the ranging distance and the phase when the wavelength ambiguity is not considered. We can reformulate this equation according to the wavelength in air $\lambda_0$:

$$\Delta D_m = \frac{\Delta\phi_D(\Delta D, \sqrt{\varepsilon_r})\lambda_0}{2\pi\sqrt{\varepsilon_r}} + \frac{\Delta\phi_n\lambda_0}{2\pi\sqrt{\varepsilon_r}} \quad (5)$$

Figure 16:
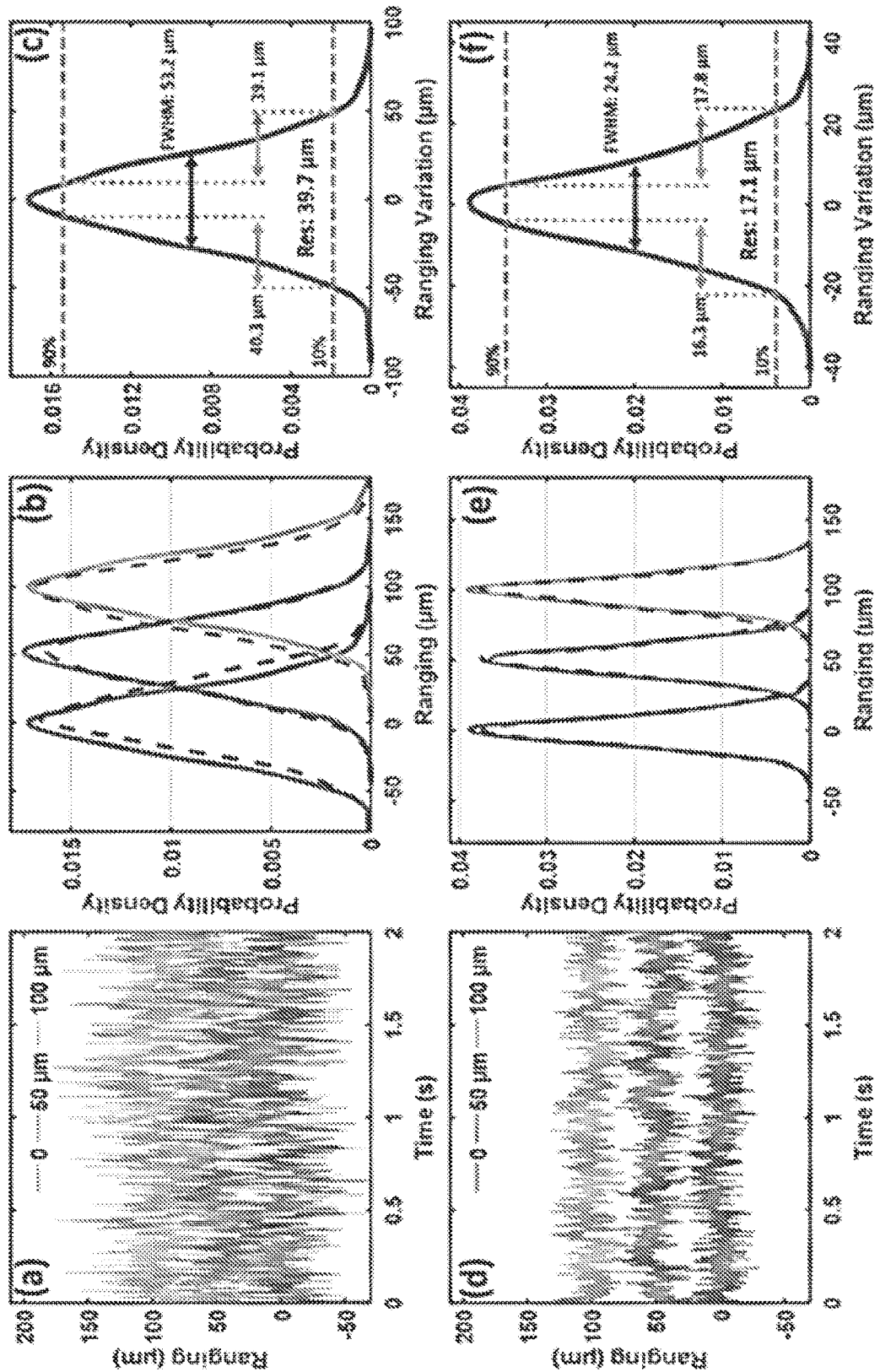
FIG. 16: Experimental ranging results of 50-μm stepping. (a), (d), and (g) are transient signals when the tag was in the air, sand, and water, respectively. (b), (e), and (h) are the probability densities of the ranging data in (a), (d), and (g), respectively. The solid curves are the density collected in 2-s duration, while the dash curves are in 0.1-s duration. (c), (f), and (i) show the analyses of ranging resolutions in air, sand and water, respectively.
Figure 16:
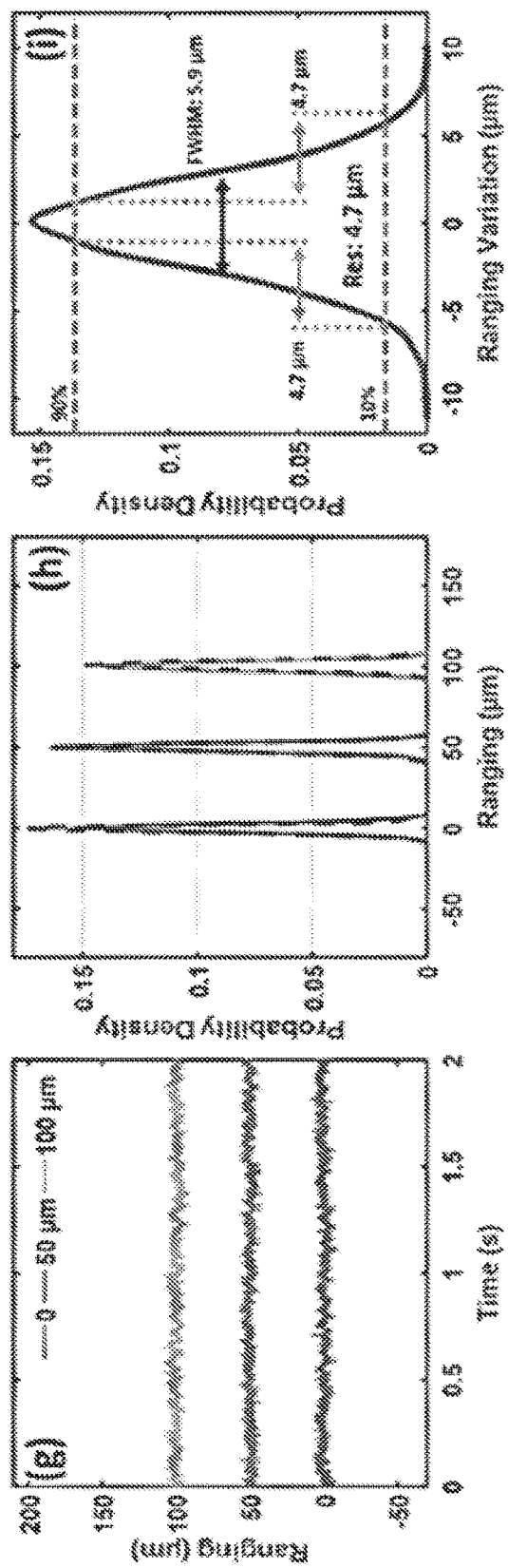

The term before the plus sign is the true ranging distance change, and the later term is the distance change caused by the noise. The phase noise caused by the hardware often has statistical characteristics which are independent to $\varepsilon_r$. Hence, the ranging variation would be reduced by $\varepsilon_r^{-0.5}$ in comparison with the measurement in air. FIG. 16 shows the experimental ranging results of 50-μm stepping in various medias of air, sand and water, where (a), (b), and (c) are in air; (d), (e), and (f) in sand; (g), (h), and (i) in water. The transient data are shown in (a), (d) and (g), and the probability density curves of each ranging data are shown in (b), (e), and (h). When the media has high permittivity, the noise level is reduced and the ranging resolution is improved, as shown in (c), (f), and (i). The extracted resolutions are 39.7, 17.1, and 4.7 μm in air, sand, and water, respectively. To estimate the operating range, the link budget was calculated by the Friis law:

$$P_r = P_t + G_t + G_r + 20\log\left(\frac{\lambda}{4\pi d}\right) \quad (6)$$

where $P_t$ is the transmitting power, $G_t$ the Tx antenna gain, $G_r$ the Rx antenna gain, $\lambda$ the wavelength, d the distance between Tx and Rx, and $P_r$ the received power. The link budget was estimated under the condition of $P_t$=30 dBm (reader Tx power), $G_t$=8 dB (reader Tx antenna gain), $G_r$=3 dB (tag antenna gain), and $\lambda$=0.3 m for downlink and 0.15 m for uplink harmonics. When d=3 m, the received power of the tag will be 0 dBm. After the NLTL converts the signal to harmonic with conversion loss of 15 dB, the Tx power from the tag is −15 dBm. Based on the same equation, the received power at the reader Rx will be −52 dBm. Under the noise floor of −122 dBm (the base bandwidth is set at 100 kHz), we have the Rx SNR at 70 dB. When the distance is up to 15 meters, the received power of the tag will be −12 dBm and the Rx SNR will drop to 42 dB, which will reduce the raw data accuracy but can still be mitigated by the moving average method due to the still high SNR. The simplified link budget analysis above is based on ideal devices and setup without consideration of variations and strong interferences. At the maximum operating range, the received power at the tag and the SNR at the reader Rx can be further reduced in realistic scenarios. However, the present estimate of SNR at 42 dB still has room to give, as many ranging receivers can be reasonably operated with SNR >20 dB.

In at least some aspects, the present concepts include a radio-frequency method for range finding, the method comprising the acts of modulating an analog signal having an intermediate frequency, $f_{IF}$, to a carrier frequency, $f_c$, using a clock signal, transmitting the modulated signal to a tag using a transceiver, the tag being located at a distance from the transceiver, receiving an uplink signal backscattered from the tag, the uplink signal being modulated at a harmonic of the carrier frequency, demodulating the uplink signal using the clock signal and calculating a distance between the tag and the transceiver based on a phase of the demodulated uplink signal. In some aspects, this method further includes modulating the analog signal to one or more additional carrier frequencies, $f_{c2} \ldots f_{cm}$, each of the one or more additional carrier frequencies derived from a common accurate reference clock signal, and wherein each of the additional carrier frequencies is not equal to $f_c$, transmitting, using a corresponding one or more additional transceivers, the one or more additional modulated signals to the tag, receiving one or more additional uplink signals backscattered from the tag, each of the one or more additional uplink signals being modulated at a second harmonic of a corresponding one of the one or more additional carrier frequencies, demodulating each of the one or more additional uplink signals using the clock signal of the corresponding one or more carrier frequencies, calculating a distance between the tag and each additional transceiver based on a difference between a phase of the analog signal and a phase of a corresponding one of the one or more demodulated uplink signals, and choosing optimal $f_{IF}$ and $f_c$'s to minimize the phase noise and uncertainties arising from the Flicker noise and the sampling jitter.

In at least some aspects, the present concepts includes a radio-frequency system for range finding, including a transceiver configured to modulate an analog signal having an intermediate frequency, $f_{IF}$, to a carrier frequency, $f_c$, using a clock signal, transmit the modulated signal, receive a backscattered uplink signal from a tag, wherein the uplink signal is transformed to modulated at a harmonic frequency of the carrier frequency and modulated with a digital code, and demodulate the uplink signal using a coherent reference clock signal, wherein the radio-frequency system further includes a processor configured to receive the demodulated uplink signal and calculate a distance between the tag and the transceiver using a phase of the demodulated uplink signal in which the coherent reference clock signal relates to the local oscillator of the receiver being derived from the same reference clock in the transmitter. In at least some aspects, the radio-frequency system processor is further configured to repeatedly calculate the distance between the tag and the transceiver at a sampling rate between 20 Hz-10 kHz.

Although the present disclosure has been described with respect to one or more particular embodiments, it will be understood that other embodiments of the present disclosure may be made without departing from the spirit and scope of the present disclosure.

What is claimed is:

1. A radio-frequency method for range finding, the method comprising:
    modulating a reference signal having an intermediate frequency, $f_{IF}$, to a downlink signal having a carrier frequency, $f_c$, using a clock signal;
    transmitting the downlink signal to a tag using a transceiver, the tag being located at a distance from the transceiver;
    receiving an uplink signal backscattered from the tag, the uplink signal having a frequency that is a harmonic of the carrier frequency;
    demodulating the uplink signal using the clock signal; and
    calculating a distance between the tag and the transceiver based on comparing the reference signal to the demodulated uplink signal comprising: determining a difference between a phase of the reference signal and a phase of the demodulated uplink signal, and determining the distance as a linear function of the difference between the phase of the reference signal and the phase of the demodulated uplink signal.

2. The method of claim 1, wherein the uplink signal is at a second harmonic of the carrier frequency to lower phase noise interference from leakage of the downlink signal.

3. The method of claim 1, wherein the step of calculating the distance is repeated at a sampling rate to update the distance.

4. The method of claim 1, wherein $f_{IF}$ is greater than a frequency where Flicker noise power density is equal to the thermal noise density.

5. The method of claim 3, further comprising calculating a moving average comprising a predetermined number of most recent calculated distances.

6. The method of claim 1, wherein obtaining the distance further comprises dividing a result by the square root of a relative permittivity of a medium between the transceiver and the tag, wherein the relative permittivity of the medium is known and relative to a vacuum.

7. The method of claim 1, wherein the uplink signal has a unique digital identification code to provide isolation from ambient noise.

8. The method of claim 7, wherein the unique digital identification code is encoded using a code-division multiple access (CDMA) protocol to provide isolation from other tags.

9. A radio-frequency system for range finding, comprising:
    a transceiver configured to:
        modulate a reference signal having an intermediate frequency, $f_{IF}$, to a downlink signal having a carrier frequency, $f_c$, using a clock signal;
        transmit the downlink signal;
        receive a backscattered uplink signal from a tag, wherein the uplink signal is at a harmonic frequency of the carrier frequency; and
        demodulate the uplink signal using the clock signal such that transceiver is a coherent transceiver;
    a tag configured to receive the downlink signal at $f_c$ and to backscatter the uplink signal at the harmonic frequency of the carrier frequency; and
    a processor configured to receive the demodulated uplink signal and calculate a distance between the tag and the transceiver based on comparing the reference signal to the demodulated uplink signal comprising: determining a difference between a phase of the reference signal and a phase of the demodulated uplink signal, and determining the distance as a linear function of the difference between the phase of the reference signal and the phase of the demodulated uplink signal.

10. The system of claim 9, wherein the harmonic frequency of the carrier frequency is the second harmonic.

11. The system of claim 9, wherein the tag is configured to encode a digital identification code onto the uplink signal using a code-division multiple access (CDMA) protocol.

12. The system of claim 11, further comprising one or more additional tags, each configured with a unique digital identification or CDMA code.

13. The system of claim 9, wherein the tag is configured to transform the downlink signal to the uplink signal without offsetting a phase of the downlink signal.

14. The system of claim 9, wherein the tag comprises a non-linear transmission line.

15. The system of claim 9, the processor is further configured to repeatedly calculate the distance at a sampling rate.

16. The system of claim 15, wherein the processor is further configured to calculate a moving average comprising a predetermined number of most recent calculated distances.

17. The system of claim 9, further comprising an analog-to-digital converter to convert the demodulated uplink signal to a digital signal, wherein the analog-to-digital converter is configured to preserve a carrier phase of the uplink signal.

18. The system of claim 9, further comprising a clock for generating the clock signal, wherein the clock is in communication with the transceiver.

19. The system of claim 9, wherein the intermediate frequency $f_{IF}$ is selected from 10 Hz to 30 MHz and a carrier frequency $f_c$ is selected from 0.5 GHz to 2 GHz.

* * * * *